United States Patent
Ishikawa

[19]

[11] Patent Number: 6,047,229
[45] Date of Patent: Apr. 4, 2000

[54] TILT CONTROL APPARATUS FOR INDUSTRIAL VEHICLES

[75] Inventor: Kazuo Ishikawa, Kariya, Japan

[73] Assignee: Kabushiki Kaisha Toyoda Jidoshokki Seisakusho, Aichi-ken, Japan

[21] Appl. No.: 09/061,307

[22] Filed: Apr. 16, 1998

[30] Foreign Application Priority Data

Jun. 18, 1997 [JP] Japan ..................................... 9-161507

[51] Int. Cl.⁷ .................................................. B60G 21/02
[52] U.S. Cl. ........................... 701/50; 414/699; 280/755; 60/368
[58] Field of Search ....................... 701/50, 38; 280/755; 60/422, 486, 368; 414/635, 699, 700

[56] References Cited

U.S. PATENT DOCUMENTS

| | | | |
|---|---|---|---|
| 3,912,246 | 10/1975 | Olsson | 267/187 |
| 4,930,975 | 6/1990 | Ito | 414/635 |
| 5,050,379 | 9/1991 | Nagai et al. | 60/368 |
| 5,188,502 | 2/1993 | Tonsor et al. | 414/699 |
| 5,617,724 | 4/1997 | Ko | 60/422 |
| 5,947,516 | 9/1999 | Ishikawa | 280/755 |

FOREIGN PATENT DOCUMENTS

| | | |
|---|---|---|
| 2034303 | 12/1970 | France . |
| 2405045 | 8/1974 | Germany . |
| 58-167214 | 1/1984 | Japan . |
| 58-167215 | 1/1984 | Japan . |
| 58-211903 | 3/1984 | Japan . |
| 9315125 | 12/1997 | Japan . |
| 1272056 | 3/1970 | United Kingdom . |
| 2217272 | 10/1989 | United Kingdom . |

*Primary Examiner*—Gary Chin
*Attorney, Agent, or Firm*—Morgan & Finnegan, L.L.P.

[57] ABSTRACT

An industrial vehicle including a frame, an axle pivotally mounted on the frame, a restriction mechanism for restricting the pivotal movement of the axle, a pair of vehicle wheels rotatably supported on the axle, and a steering mechanism having a steering wheel for steering the vehicle wheels in accordance with rotation of the steering wheel. A first detecting device detects an angular position of the steering wheel. The angular position represents a steering amount of the steering wheel. A second detecting device detects a wheel angle. The wheel angle is the angle between a plane perpendicular to a rotation axis of the vehicle wheel and a line representing straight running of the vehicle. A third detecting device detects a yaw rate of the vehicle. A fourth detecting device detects a vehicle speed. A calculating mechanism calculates a plurality of variables based on the detected angular position of the steering wheel, wheel angle, yaw rate and vehicle speed. The variables include lateral acceleration, yaw rate changing rate, and lateral acceleration changing rate. A control mechanism controls the restriction mechanism to restrict the pivotal motion of the axle when one of the variables exceeds a predetermined reference value.

16 Claims, 13 Drawing Sheets

Wheel Angle Detection Range
In Normal Operation

Handle Angle H$\theta$
(Wheel Angle)

1

TILT CONTROL APPARATUS FOR INDUSTRIAL VEHICLES

BACKGROUND OF THE INVENTION

The present invention relates to a tilt control apparatus for industrial vehicles, and more particularly, to an industrial vehicle tilt control apparatus for locking an axle, which is tiltable with respect to the vehicle body, in accordance with road conditions.

In the prior art, forklifts employ rear axles that are tiltable with respect to the vehicle body to stabilize the traveling forklift. However, the tiltable axle causes excessive tilting of the vehicle body when centrifugal force is produced as the forklift changes directions. This degrades the stability of the traveling vehicle.

Accordingly, Japanese Unexamined Patent Publication No. 58-211903 describes a forkilift having a detector that detects centrifugal force. When the centrifugal force acting on the vehicle exceeds a predetermined value, the tiltable axle is locked. The locking of the axle minimizes the tilting of the vehicle body when changing directions and enables stable steering.

Japanese Unexamined Patent Publication No. 58-167215 describes a forklift having a weight detector for detecting the weight of objects held on the forklift's forks and a height detector for detecting the vertical position of the forks. The tiltable axle is locked when the weight of the object carried on the forks is heavier than a predetermined value and when the forks are located above a predetermined position.

However, in both types of forklifts, malfunctioning of any one of the detectors would hinder the locking of the axle. This would hinder stable steering of the vehicle.

SUMMARY OF THE INVENTION

Accordingly, it is an objective of the present invention to provide an industrial vehicle tilt control apparatus that stabilizes steering regardless of malfunctioning detectors, which are used to determine whether to lock the axle.

To achieve the above objective, the present invention provides an industrial vehicle for conveying a load. The industrial vehicle includes a frame, an axle pivotally mounted on the frame, a restriction mechanism for restricting the pivotal movement of the axle, a pair of vehicle wheels rotatably supported on the axle, and a steering mechanism having a steering wheel for steering the vehicle wheels in accordance with rotation of the steering wheel. A first detecting device detects an angular position of the steering wheel. The angular position represents a steering amount of the steering wheel. A second detecting device detects a wheel angle. The wheel angle is the angle between a plane perpendicular to a rotation axis of the vehicle wheel and a line representing straight running of the vehicle. A third detecting device detects a yaw rate of the vehicle. A fourth detecting device detects a vehicle speed. A calculating mechanism calculates a plurality of variables based on the detected angular position of the steering wheel, wheel angle, yaw rate and vehicle speed. The variables include lateral acceleration, yaw rate changing rate, and lateral acceleration changing rate. A control mechanism controls the restriction mechanism to restrict the pivotal motion of the axle when one of the variables exceeds a predetermined reference value.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment according to the present invention will now be described with reference to FIGS. 1 to 12.

Figure 1:
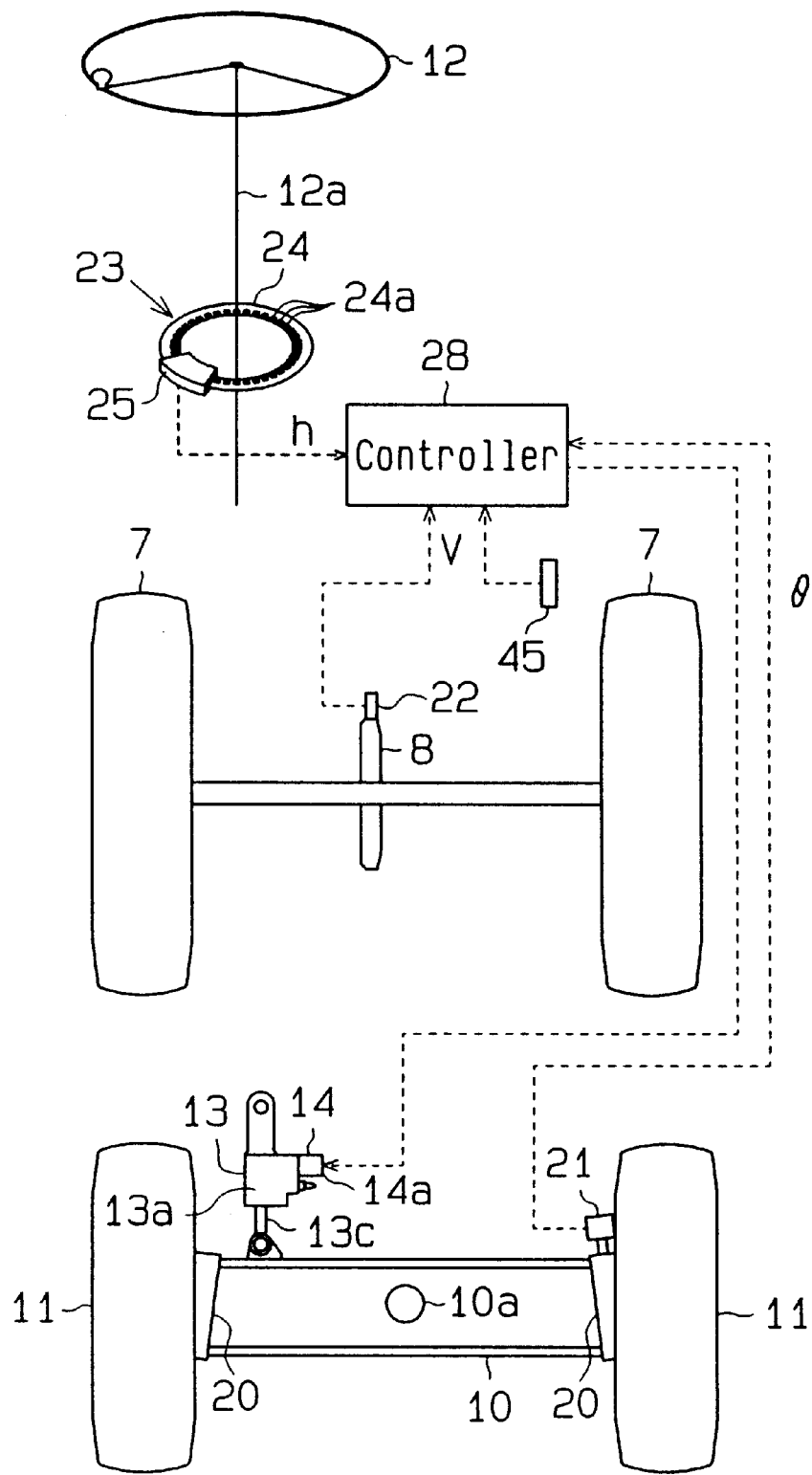
FIG. 1 is a diagrammatic view showing a first embodiment of a tilt control apparatus according to the present invention.
Figure 3:
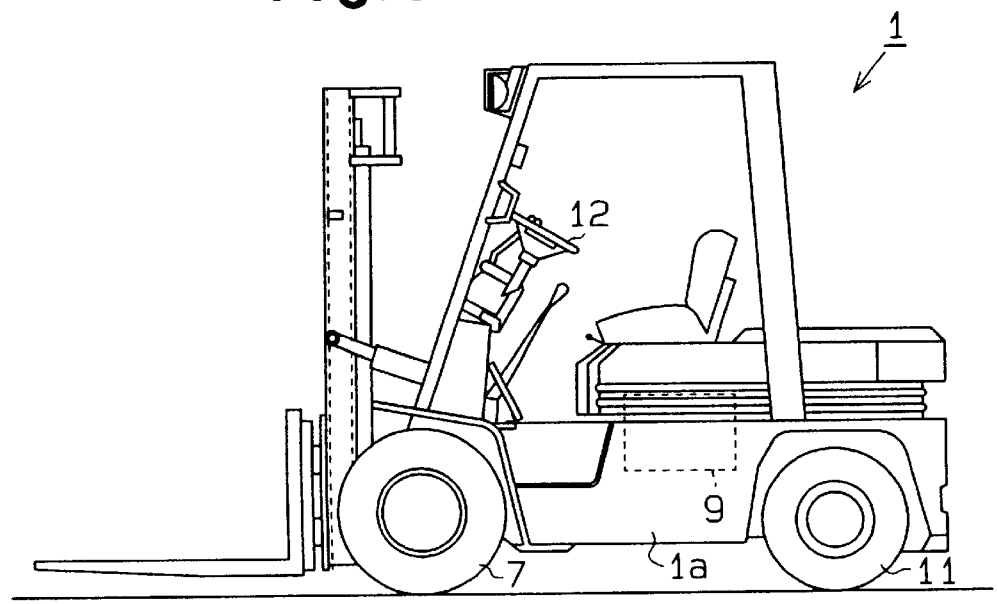
FIG. 3 is a side view showing a forklift employing the apparatus of FIG. 1.

FIGS. 1 and 3 show an industrial vehicle, or forklift 1, having two front drive wheels 7 and two rear steered wheels 11. The left and right front wheels 7 are connected to an engine 9 (shown in FIG. 3) by a differential gear 8 (shown in FIG. 1) and a transmission (not shown). Thus, the front wheels 7 are driven by the engine 9.

Figure 2:
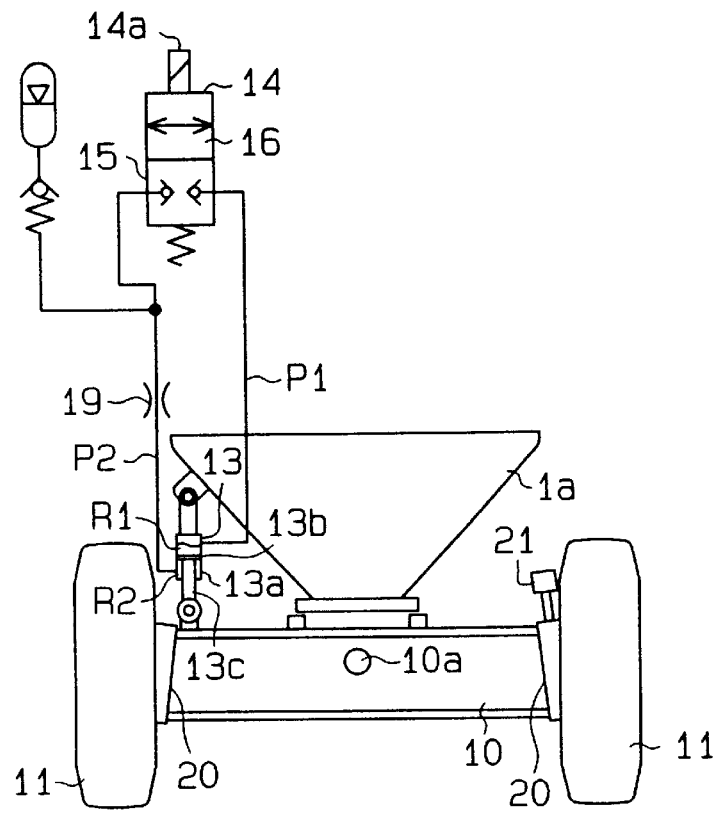
FIG. 2 is a diagrammatic view showing the axle locking mechanism of the apparatus of FIG. 1.

As shown in FIGS. 1 and 2, the forklift 1 has a body frame 1a. A rear axle 10 extends laterally through the lower rear portion of the body frame la between the rear wheels 11. The rear axle 10 is supported pivotally about a center pin 10a to permit tilting of the rear axle 10 with respect to the body frame 1a. A king pin 20 supports each rear wheel 11 to turn the rear wheel 11 with respect to the rear axle 10. The rear wheels 11 are steered by a steering mechanism (not shown). The steering mechanism includes a steering cylinder and is arranged on the rear axle 10. The rear wheels 11 are pivoted integrally with the rear axle 10 about the center pin 10a. A steering wheel, or steering handle 12, is manipulated to actuate the steering cylinder and steer the rear wheels 11 by means of the king pin 20.

A hydraulic damper 13 connects the body frame 1a to the rear axle 10. The damper 13 is a multimovement cylinder that includes a housing 13a, a piston 13b, and a piston rod 13c. The housing 13a is coupled to the body frame 1a, while the piston rod 13c, which extends from the piston 13b, is coupled to the rear axle 10.

The damper 13 houses a first chamber R1 and a second chamber R2, which are partitioned by the piston 13b. An electromagnetic switch valve 14 is connected to the first chamber R1 through a first passage P1 and to the second chamber R2 through a second passage P2. The electromagnetic switch valve 14 has two ports and is normally closed. Thus, the switch valve 14 is closed when de-excited. The switch valve 14 also includes a spool having a restriction portion 15 and a flow portion 16.

The spool of the electromagnetic switch valve 14 is located at a closing position in FIG. 2. The flow of hydraulic oil into and out of the chambers R1, R2 is prohibited in this state. Thus, the switch valve 14 locks the damper 13 and prohibits tilting of the rear axle 10 with respect to the body frame 1a. When the spool is shifted to a communication position from the state shown in FIG. 2, the flow of hydraulic oil into and out of the chambers R1, R2 is permitted. Thus, the switch valve 14 unlocks the damper 13 and permits tilting of the rear axle 10 with respect to the body frame 1a. A throttle valve 19 is arranged in the second passage P2. The damper 13 and the electromagnetic switch valve 14 construct an axle restricting mechanism.

As shown in FIGS. 1 and 2, a wheel angle sensor 21 is arranged on one of the king pins 20 to detect the steered angle of the rear wheel 11, or wheel angle θ in correspondence with the turned amount of the king pin 20. A device such as a potentiometer may be employed as the wheel angle sensor 21. As shown in FIG. 1, a vehicle velocity sensor 22 is arranged on the differential gear 8 to detect the speed, or velocity V, of the forklift 1 in accordance with the rotation of the differential gear 8.

The steering handle 12 is mounted on a steering shaft 12a. A rotary encoder 23 is arranged on the steering shaft 12a to detect the angular position of the steering handle 12, or handle angle Hθ. The rotary encoder 23 includes a disc 24 and sets of photo couplers. The disc and photo couplers are rotated integrally. The disc 24 has equally spaced slits 24a that are arranged circumferentially. The photo couplers detect the light that passes through the slits 24a. The rotary encoder 23 serves as a handle angle sensor 25. The handle angle sensor 25 outputs digital signals h in accordance with the handle rotation detected by the photo transistors. The rotary encoder 23 may be used to compensate for the difference between the rotated angle of the steering handle 12 and the desired steered angle of the rear wheels 11. In this embodiment, the rotary encoder 23 is used to locate malfunctions.

Figure 4:
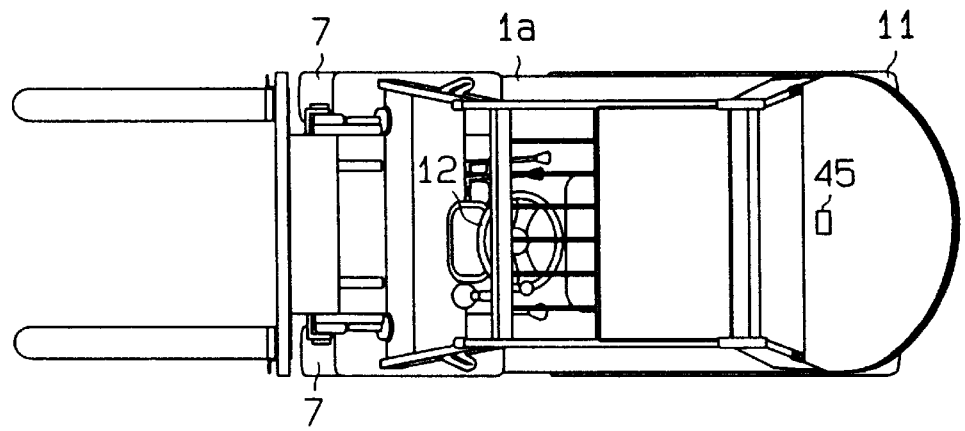
FIG. 4 is a plan view showing the forklift of FIG. 3.

As shown in FIG. 1, the forklift 1 includes a controller 28. The controller 28 is connected to a yaw rate gyroscope 45, which detects the yaw rate ω of the forklift 1. The gyroscope 45 is located on the rear upper surface of the body frame 1a, as shown in FIG. 4.

The controller 28 is also electrically connected to a solenoid 14a of the electromagnetic switch valve 14 and the sensors 21, 22, 25, 45.

Figure 5:
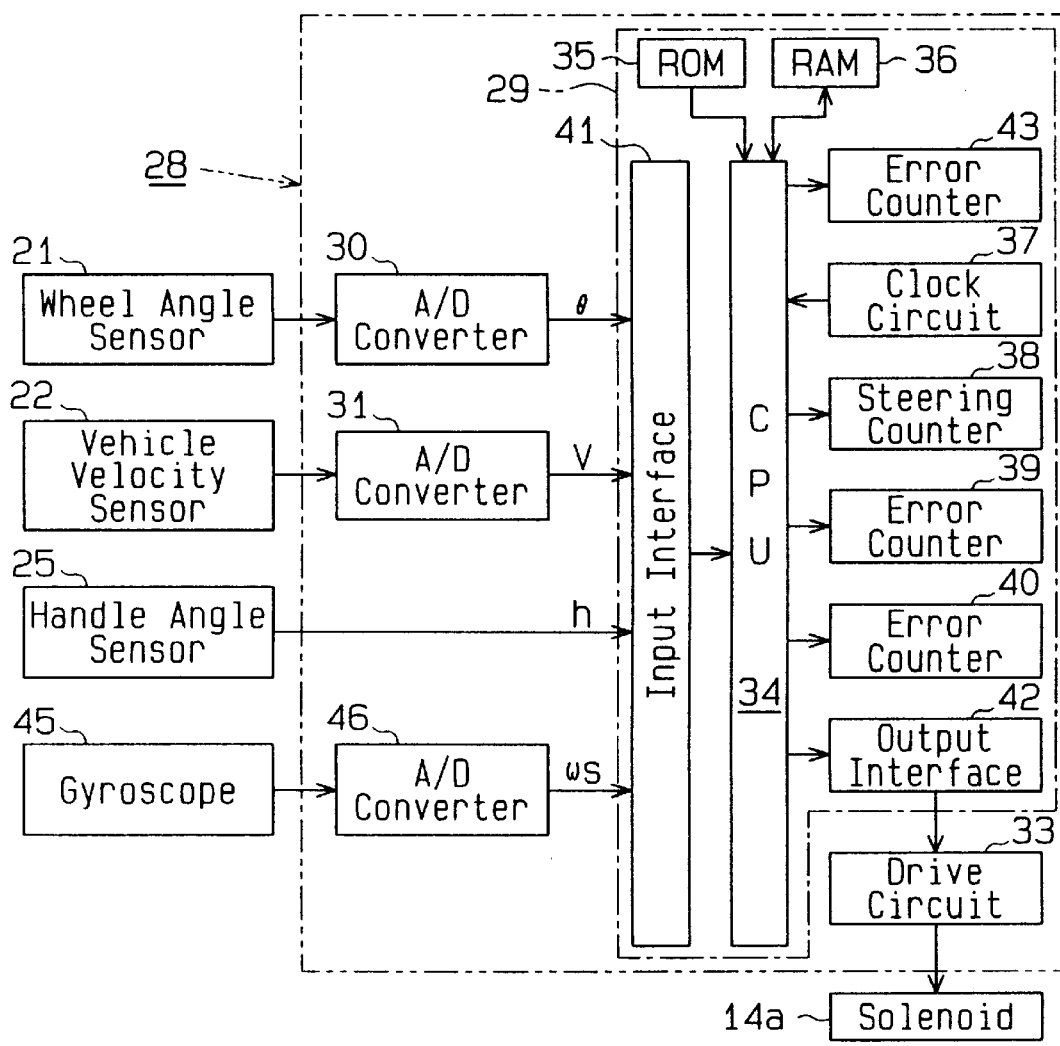
FIG. 5 is a block diagram showing the electric structure of the apparatus of FIG. 1.

The electric structure of forklift 1 will now be described with reference to FIG. 5.

The controller 28 incorporates a microcomputer 29, analog to digital (A/D) converters 30, 31, 46, and a drive circuit 33, which is employed for the solenoid 14a. The microcomputer 29 constructs first, second, and third judgement value detectors. The controller 28 also includes a central processing unit (CPU) 34, a read only memory (ROM) 35, a random access memory (RAM) 36, a clock circuit 37, a steering counter 38, error counters 39, 40, 43, an input interface 41, and an output interface 42.

The wheel angle θ detected by the wheel angle sensor 21 is sent to the CPU 34 by means of the A/D converter 30. The vehicle velocity V detected by the vehicle velocity sensor 22 is sent to the CPU 34 by means of the A/D converter 31. The yaw rate ω detected by the sensor 45 is sent to the CPU 34 by means of the A/D converter 46. The digital signal h is sent to the CPU 34 from the handle angle sensor 25. The CPU 34 sends command signals to drive circuit 33 to excite and de-excite the solenoid 34a. More specifically, the electromagnetic switch valve 14 is excited when the CPU 34 sends an unlock signal to move the spool to the communication position. The electromagnetic switch valve 14 is de-excited when the CPU 34 sends a lock signal to move the spool to the closing position.

Figure 9:
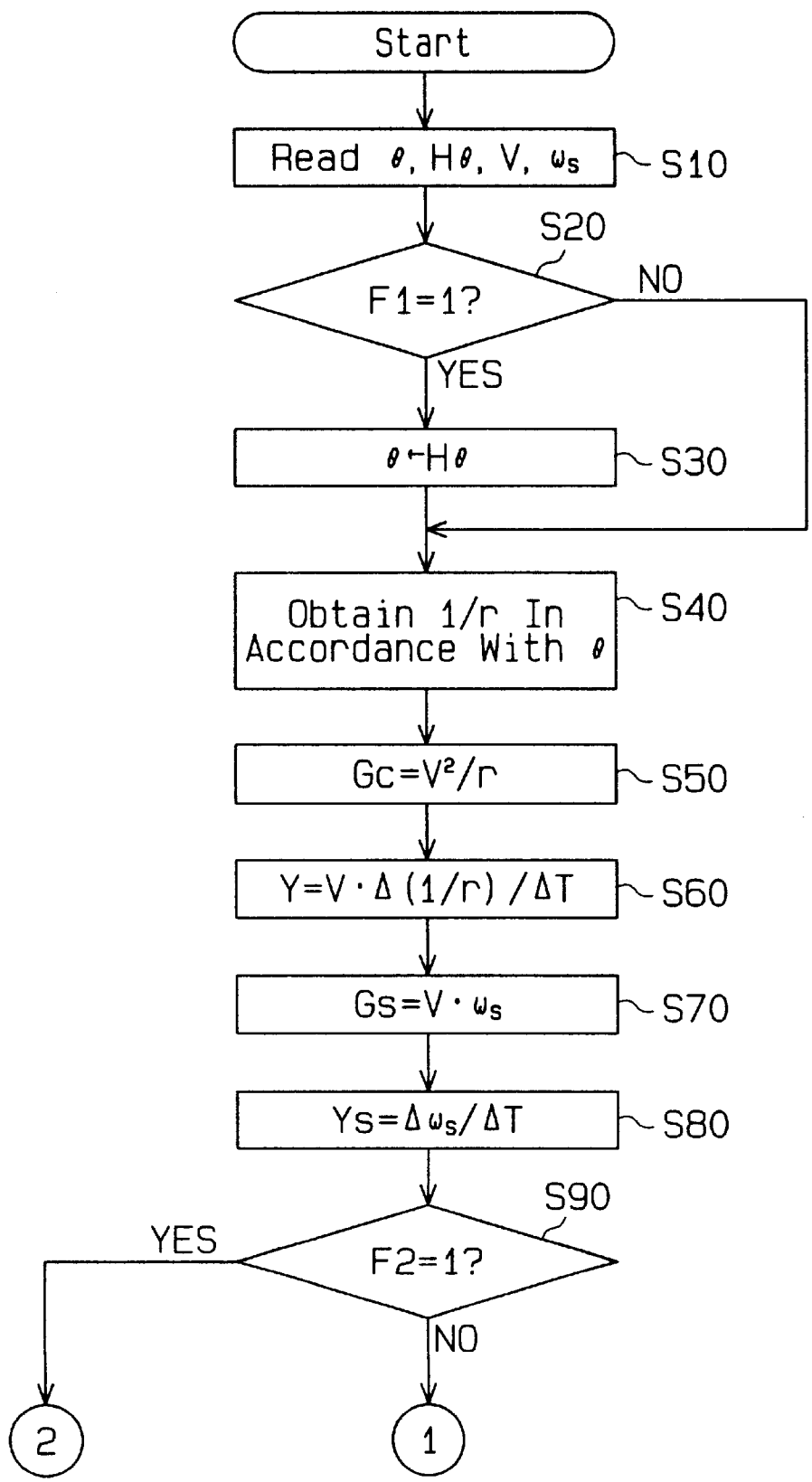
FIG. 9 is a flowchart showing the tilt control routine.
Figure 10:
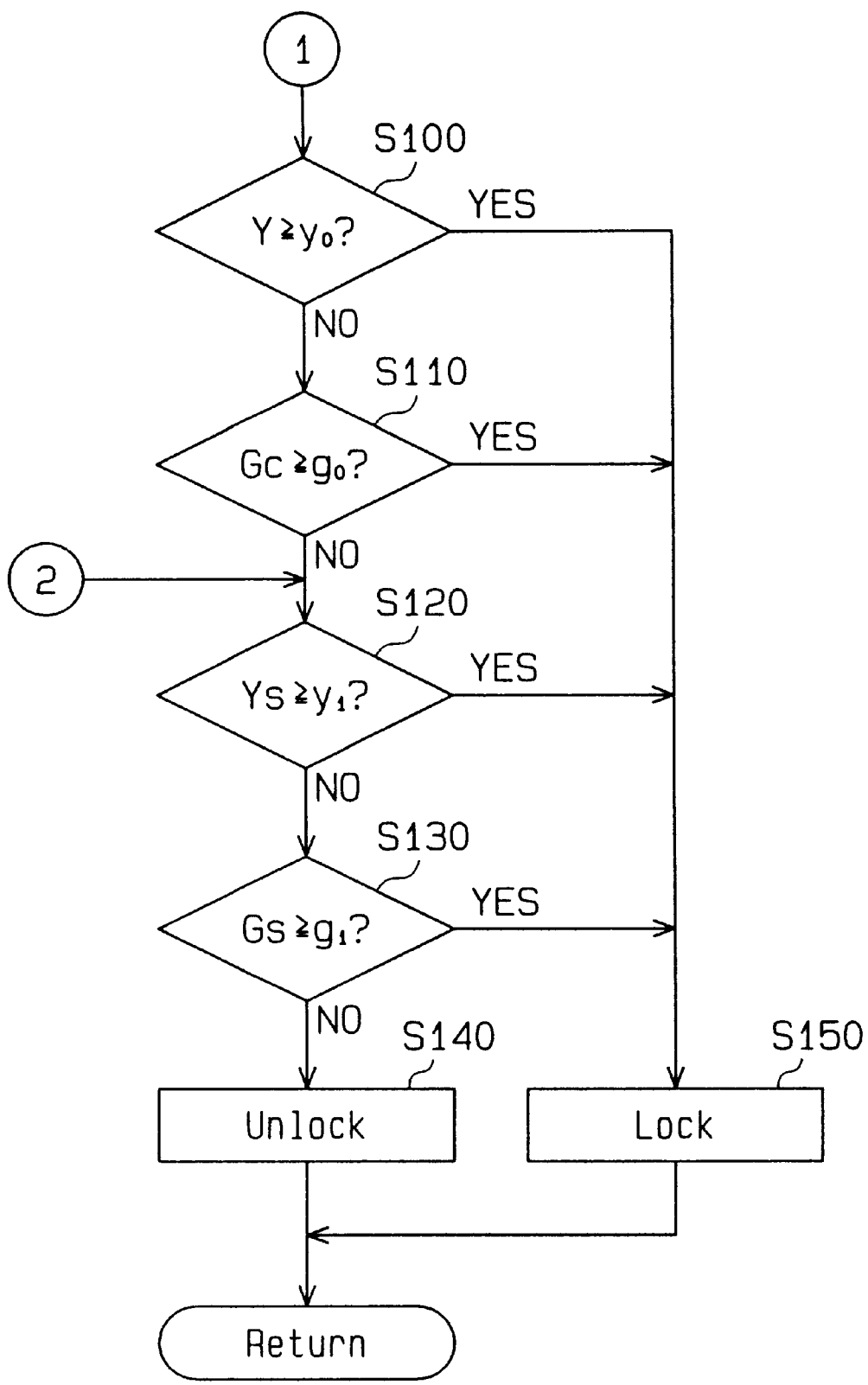
FIG. 10 is a flowchart showing the tilt control routine continuing from FIG. 9.
Figure 11:
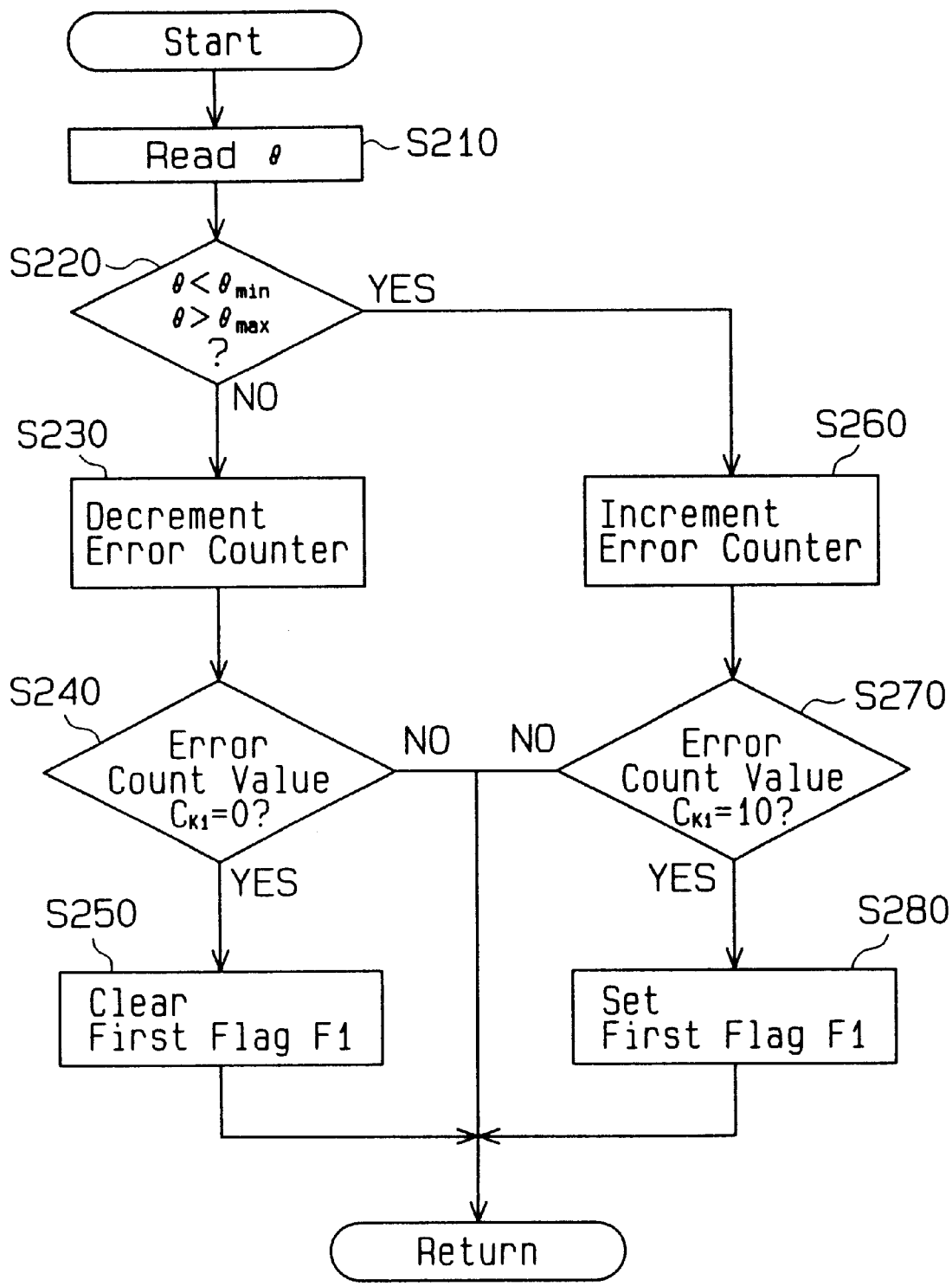
FIG. 11 is a flowchart showing the wire breakage/short circuit testing routine.
Figure 12:
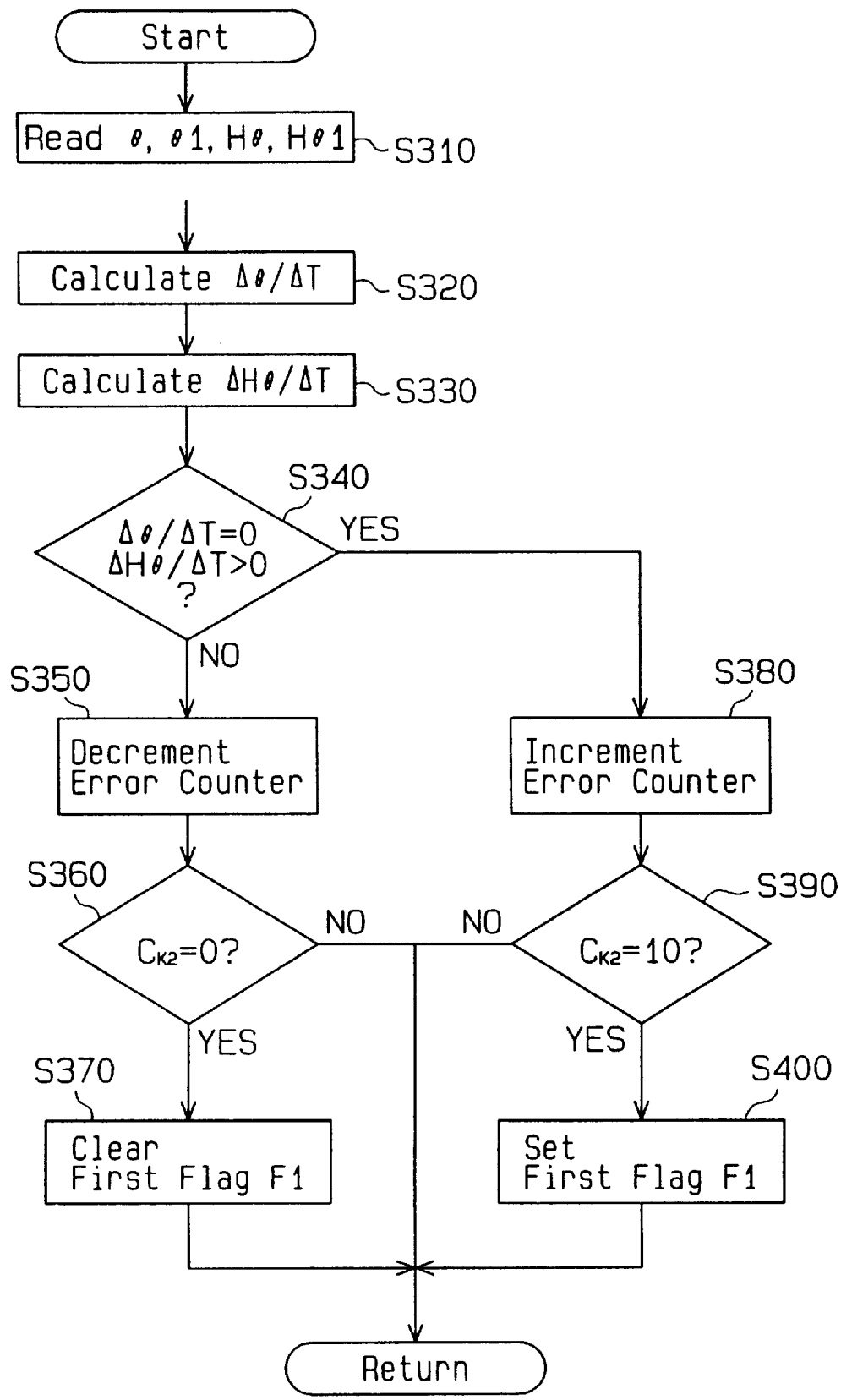
FIG. 12 is a flowchart showing a fall off testing procedure.

Various data such as the tilt control routine shown in FIGS. 9 and 10, and the sensor testing routine shown in FIGS. 11 and 12 are stored in the ROM 35. Tilt control refers to a control that locks the rear axle 10 to suppress the lateral tilting of the vehicle body when the traveling forklift 1 becomes unstable. Tilt control is carried out in accordance with the traveling state of the forklift 1 and the state of the object carried by the forklift 1.

When performing the tilt control, various judgement values (variables) are detected periodically to determine whether or not to lock the rear axle 10.

The judgement values (variables) include the parameters of centrifugal accelerations (lateral acceleration) Gc and Gs, which are applied to the forklift 1 when changing directions. The lateral acceleration Gc is obtained from the vehicle velocity and the turning radius, while the lateral acceleration Gs is obtained from the vehicle velocity and the yaw rate. The lateral acceleration Gs will be described in more detail later.

The judgement values also include the changing rate Y of the estimated yaw rate Ψ (angular velocity produced when changing directions) with respect to time, or the estimated yaw rate changing rate.

Another parameter of the judgement values is the changing rate Ys of the actual yaw rate ω (angular velocity produced when changing directions) with respect to time.

The rear axle 10 is locked when any one of the periodically detected judgement values of Gc, Gs, Y, Ys becomes equal to or greater than the reference values of $g_0$, $g_1$, $y_0$, $y_1$, respectively.

The reference values of $g_0$, $g_1$, $y_0$, $y_1$ are obtained either from experiments or theoretical calculations and represent values that indicate when the rear axle 10 should be locked to stabilize the traveling vehicle.

The clock circuit 37 sends clock signals to the CPU 34. The CPU 34 executes the tilt control routine and the sensor testing routine for every predetermined time interval (e.g., ten milliseconds). The sensor testing routine is executed each time a predetermined number of the swing control routine is executed.

The steering counter 38 counts count values H, which correspond with the handle angle Hθ. The count value H detects the handle turning direction from two types of digital signals, which are sent to the CPU 34 from the handle angle sensor 25 and which are offset from one another by a difference of one fourth the wavelength of a phase. When the steering handle 12 is turned to the left, the counter value H is decremented each time an edge of the digital signal h is detected. When the steering handle 12 is turned to the right, the counter value H is incremented each time an edge of the digital signal h is detected.

The three error counters 39, 40, 43 are used when performing the sensor testing routine (FIGS. 11 and 12). The error counters 39, 40, 43 indicate count values $C_{K1}$, $C_{K2}$, $C_{K3}$, respectively. Each counter 39, 40, 43 increments the associated count value $C_{K1}$, $C_{K2}$, $C_{K3}$ each time the condition indicating malfunctioning of the wheel angle sensor 21 or the handle angle sensor 25 is satisfied until reaching the maximum value of ten. The count values $C_{K1}$, $C_{K2}$, $C_{K3}$ are also decremented each time the conditions indicating normal functioning of the sensors 21, 22 are satisfied until reaching the minimum value of zero. The maximum and minimum count values are not limited to the above values and may be changed arbitrarily.

Figure 6:
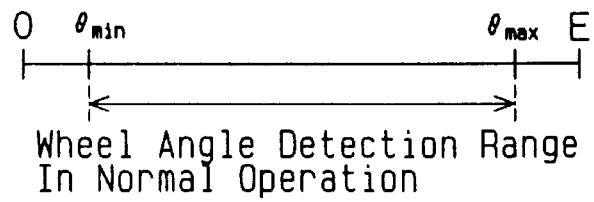
FIG. 6 is an explanatory diagram used to describe the voltage detected in accordance with the wheel angle.

FIG. 6 shows the wheel angle (voltage) θ detected by the wheel angle sensor 21. When the wheel angle sensor 21 is functioning normally, the input value θ is included in the range of $\theta_{min} \leq \theta \leq \theta_{max}$. Therefore, if the input value θ is smaller than the minimum value $\theta_{min}$, the wheel angle sensor 21 is judged as malfunctioning due to wire breakage. If the input value θ is greater than the maximum value $\theta_{max}$, the wheel angle sensor 21 is judged as malfunctioning due to short circuit. In FIG. 6, the alphabet E denotes the voltage of the power source.

When the wheel angle sensor 21 falls off from the king pin 20, the wheel angle θ does not change despite the manipulation of the steering handle 12. A number of precedent wheel angle data θ and handle angle data Hθ are stored in the RAM 36. The wheel angle sensor 21 is determined as having fallen off from the associated king pin 20 if the wheel angular velocity $\Delta\theta/\Delta T=|\theta-\theta 1|/\Delta T$) is zero although the steering handle angular velocity $\Delta H\theta/\Delta T(=|H\theta-H\theta 1|/\Delta T)$ is positive. In other words, if the fall off condition of ($\Delta H\theta/\Delta T>0$ and $\Delta\theta/\Delta T=0$) is satisfied, the wheel angle sensor 21 is determined as malfunctioning. The values of θ1 and Hθ1 indicate data that was taken earlier by a predetermined time.

If the wheel angle sensor 21 is functioning normally, the wheel angle θ and the vehicle velocity V are used to calculate the lateral acceleration Gc and the estimated yaw rate changing rate Y. If the wheel angle sensor 21 is malfunctioning, the handle angle Hθ and the vehicle velocity V are used to calculate the lateral acceleration Gc and the estimated yaw rate changing rate Y. In other words, the lateral acceleration Gc and the estimated yaw rate changing rate Y are calculated using the steering handle angle Hθ in lieu of the wheel angle θ, as shown in the flowchart of FIGS. 9 and 10.

The ROM 35 stores a map that is referred to when obtaining the vehicle turning radius reciprocal 1/r of the from the wheel angle θ (handle angle Hθ). The estimated lateral acceleration Gc is obtained from the following equation (1) using the turning radius reciprocal 1/r, which is determined from the wheel angle θ (handle angle Hθ).

$$Gc = V^2/r \quad (1)$$

The estimated yaw rate changing rate Y is obtained from the following equation (2)

$$Y = V \cdot \Delta(1/r)/\Delta T \quad (2)$$

In the above equation, $\Delta(1/r)$ corresponds to the changing amount of the turning radius reciprocal 1/r per predetermined time $\Delta T$ (e.g., ten milliseconds). A number of the prior wheel angle data θ and the handle angle data Hθ are stored in the RAM 36. The changing amount $\Delta(1/r)$ $(=|1/r-1/r1|)$ is calculated by using the turning radius reciprocal 1/r1, which is determined from the wheel angle data θ1 (handle angle data Hθ1) that was taken earlier by a predetermined time $\Delta T$. In this embodiment, the turning radius reciprocal 1/r is negative when the vehicle is turned to the left and positive when turned to the right.

The yaw rate ω is represented by ω=V/r. Thus, the presumed yaw rate changing rate $Y(=\Delta\omega/\Delta T)$ corresponds to the time derivation of this formula and is represented by the following equation.

$$Y = V \cdot \Delta(1/r)/\Delta T + \Delta V/\Delta T \cdot (1/r) \quad (3)$$

In equation (3), the second clause may be ignored if the vehicle velocity V is substantially the same when the forklift 1 changes directions ($\Delta V/\Delta T=0$). In this embodiment, the approximate equation of equation (3), that is, formula (2), is used to obtain the estimated yaw rate changing rate Y.

Once the rear axle 10 is locked, the rear axle 10 is unlocked only when the judgement value becomes lower than the locking value by a predetermined value. This prevents frequent locking and unlocking when the estimated yaw rate changing rate Y coincidentally approaches the reference value $y_0$. The rear axle 10 is locked in the same manner in the embodiments described below.

In the flowchart shown in FIGS. 9 and 10, steps S10, S40, S50, S60 are carried out to detect the first and second judgement values. Steps S10, S70 are carried out to detect the third detection value. Steps S10, S80 are carried out to detect the yaw rate changing rate. Steps S100 to S150 are carried out to restrict the tilting of the axle.

Figure 13:
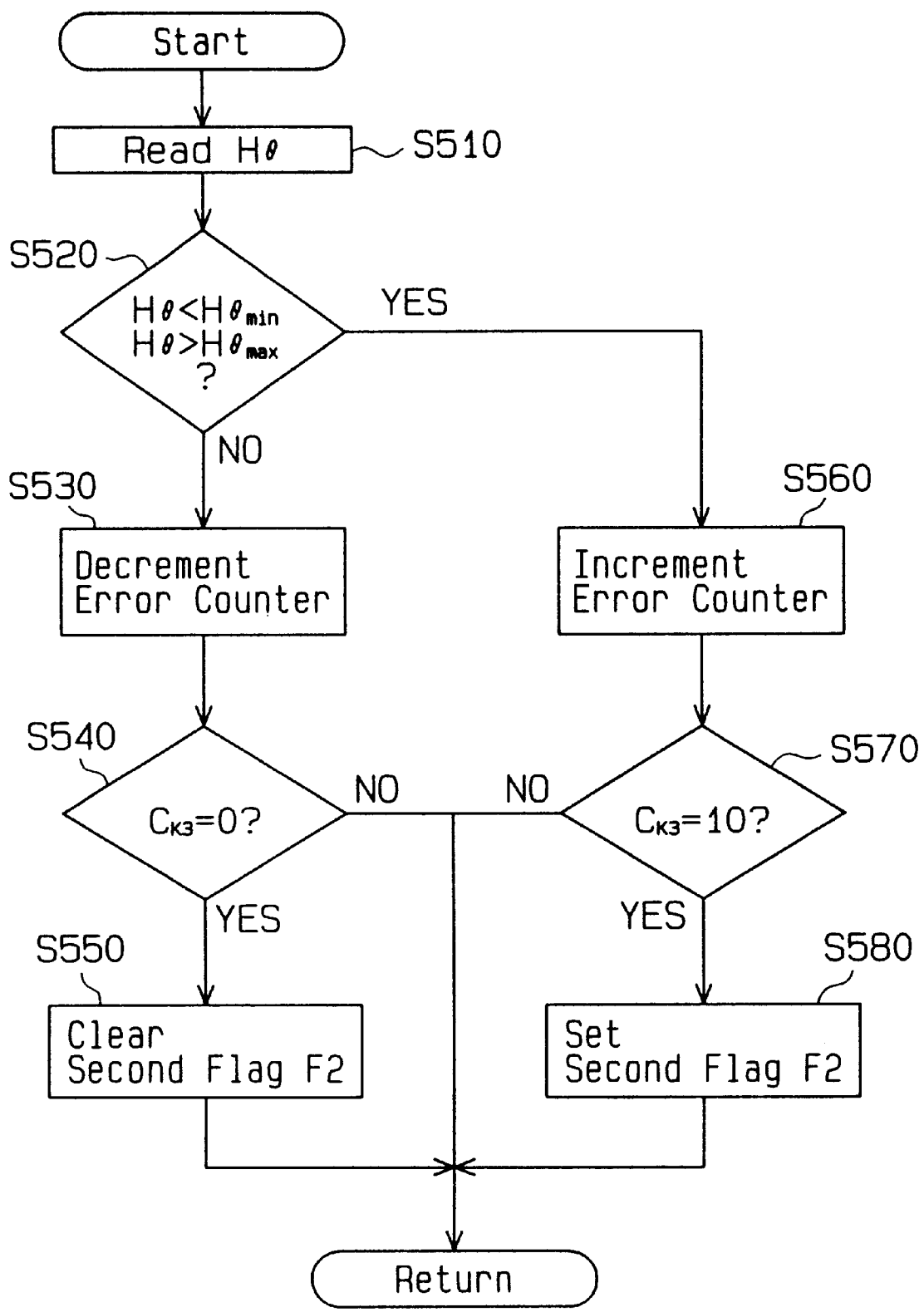
FIG. 13 is a flowchart showing the short circuit testing procedure.

In the flowchart shown in FIGS. 11 to 13, steps S210 to S280 and steps S310 to S400 are carried out to detect malfunctions based on the wheel angle. Steps S510 to S580 are carried out to detect malfunctions based on the handle angle.

The tilt control routine and the sensor testing routine will now be described with reference to the flowcharts shown in FIGS. 9 to 13. When an ignition key is turned to an ON position, the CPU 34 receives detection signals θ, V, h, $\omega_s$ from the associated sensors 21, 22, 25, 45. The CPU 34 executes the tilt control routine for every predetermined time (e.g., ten milliseconds) and executes the sensor testing routine for every predetermined number of executions of the tilt control. The steering counter 38 counts the count value H in accordance with the handle angle Hθ.

The sensor testing routine will now be described.

The wire breakage/short circuit testing of the wheel angle sensor 21 will first be described with reference to FIG. 11. At step S210, the CPU 34 reads the wheel angle θ. At step S220, the CPU 34 judges whether or not the wire breakage and short circuit conditions of $\theta<\theta_{min}$ or $\theta>\theta_{max}$ are satisfied. If the wheel angle sensor 21 is functioning normally and the wheel angle θ is in the range of $\theta_{min} \leq \theta \leq \theta_{max}$, the CPU 34 proceeds to step S230 and decrements the count value $C_{K1}$ of the error counter 39.

If a wire breakage occurs in the wheel angle sensor 21, the wheel angle θ satisfies the condition of $\theta<\theta_{min}$. If a short circuit occurs in the wheel angle sensor 21, the wheel angle θ satisfies the condition of $\theta>\theta_{max}$. If any one of the conditions is satisfied, the CPU 34 proceeds to step S260 and increments the count value $C_{K1}$ of the error counter 39.

The CPU 34 proceeds to step S240 from step S230. When the wheel angle sensor 21 is functioning normally, the count value $C_{K1}$ of the error counter 39 indicates zero during the execution of the sensor testing routine. If the CPU 34 determines that the count value $C_{K1}$ of the error counter 39 indicates zero in step S240, the CPU 34 proceeds to step S250 and clears the first malfunction flag F1. If the count value $C_{K1}$ is greater than zero, the CPU 34 terminates the testing routine.

The CPU 34 proceeds to step S270 from step S260. If the count value $C_{K1}$ remains lower than ten, the CPU 34 determines that the wheel angle sensor 21 is functioning normally and terminates the testing routine. When the count value $C_{K1}$ reaches ten, the CPU 34 proceeds to step S280 and sets the first malfunction flag to one. This indicates that the wheel angle sensor 21 is malfunctioning.

For example, if the voltage corresponding to the wheel angle θ is temporarily unstable such as during the starting of the engine, the conditions indicating malfunctions, θ<θmin or θ>θmax, may be satisfied temporarily for a short period of time. In such case, the count value $C_{K1}$ does not reach ten and the first malfunction flag F1 is thus not set at one. However, when a wire breakage or a short circuit takes place in the wheel angle sensor 21, the count value $C_{K1}$ reaches ten and the CPU 34 thus sets the first malfunction flag F1 to one.

The fall off testing routine of the wheel angle sensor 12 will now be described with reference to FIG. 12. At step S310, the CPU 34 reads the wheel angles θ, θ1 and the handle angles Hθ, Hθ1. At step S320, the CPU 34 calculates the wheel velocity $\Delta\theta/\Delta T = |\theta - \theta 1|\Delta T$. At step S330, the CPU 34 calculates the handle angular velocity $\Delta H\theta/\Delta T = |H\theta - H\theta 1|\Delta T$.

At step S340, the CPU 34 determines whether or not the conditions corresponding to a fall off state of the wheel angle sensor 21 are satisfied. The fall off condition related to the wheel angular velocity is $\Delta\theta/\Delta T = 0$ and the fall off condition related to the handle angular velocity is $\Delta H\theta/\Delta T > 0$. In other words, the CPU 34 determines whether the wheel angular velocity changes appropriately in accordance with the handle angular velocity. When the wheel angle sensor 21 is functioning normally, the condition related to the wheel angular velocity ($\Delta\theta/\Delta T > 0$) is always satisfied if the condition related to the handle angular velocity ($\Delta H\theta/\Delta T > 0$) is satisfied. In such case, the fall off condition is not satisfied. Thus, the CPU 34 proceeds to step S350 and decrements the count value $C_{K2}$ of the error counter 40.

If the wheel angle sensor 21 falls off the king pin 20, the turning of the king pin 20 is not transmitted to the input shaft of the wheel angle sensor 21 when the associated rear wheel 11 is steered. This results in the wheel angle θ detected by the wheel angle sensor 21 being constant. In such case, the wheel angular velocity does not correspond with the handle angular velocity. Thus, the CPU 34 proceeds to step S380 and increments the count value $C_{K2}$ of the error counter 40.

At step S390, the CPU 34 terminates the testing routine if the count value $C_{K2}$ is lower than ten. When the count value $C_{K2}$ reaches ten, the CPU 34 proceeds to step S400 and sets the first malfunction flag F1 to one to indicate that the wheel angle sensor 21 has fallen off from the king pin 21.

If the wheel angle sensor 21 is functioning normally, the count value $C_{K2}$ of the error counter 40 indicates zero. In such case, the CPU 34 proceeds to step S370 from step S360 and clears the first malfunction flag F1 to indicate that the wheel angle sensor 21 is functioning normally.

For example, if the wheel angle sensor 21 is functioning normally but a delay in the movement of the rear wheel 11 occurs with respect to the handle manipulation, the conditions of $\Delta H\theta/\Delta T > 0$ and $\Delta\theta/\Delta T = 0$ may be satisfied. However, since such state is temporary, the count value $C_{K2}$ does not reach ten. Therefore, the first malfunction flag F1 remains set at zero. If the wheel angle sensor 21 falls off from the king pin 20, the count value $C_{K2}$ reaches ten and then remains at this value. Thus, the first malfunction flag F1 remains set at one.

The wire breakage/short circuit testing routine of the handle angle sensor 25 will now be described with reference to FIG. 13.

At step 510, the CPU 34 reads the handle angle Hθ. At step S520, the CPU 34 judges whether or not the wire breakage and short circuit conditions of $H\theta < H\theta_{min}$ and $H\theta > H\theta_{max}$ are satisfied. If the handle angle sensor 25 is functioning normally and the handle angle Hθ is in the range of Hθmin≦Hθ≦Hθmax, the CPU 34 proceeds to step S530 and decrements the count value $C_{K3}$ of the error counter 43.

If a wire breakage occurs in the handle angle sensor 25, the handle angle Hθ is a value that satisfies the condition of $H\theta < H\theta_{min}$. If a short circuit occurs in the handle angle sensor 25, the handle angle Hθ is a value that satisfies the condition of $H\theta > H\theta_{max}$. If any one of the conditions is satisfied, the CPU 34 proceeds to step S560 and increments the count value $C_{K3}$ of the error counter 43.

From step S560, the CPU 34 proceeds to step S570. If the count value $C_{K3}$ is lower than ten, the CPU 34 terminates the routine. If the CPU 34 determines that the count value $C_{K3}$ has reached ten in step S570, the CPU 34 proceeds to step S580 and sets the second malfunction flag F2 at one.

From step S530, the CPU 34 proceeds to step S540. When the handle angle sensor 25 is functioning normally, the count value $C_{K3}$ of the error counter 43 indicates zero. If the count value $C_{K3}$ of the error counter 43 is determined as indicating zero in step S540, the CPU 34 proceeds to step S550 and clears the second malfunction flag F2.

For example, if the detected voltage θ is temporarily unstable such as during the starting of the engine, the conditions indicating malfunctions, $H\theta < H\theta_{min}$ or $H\theta > H\theta_{max}$ may be satisfied temporarily for a short period of time. In such case, the count value $C_{K1}$ does not reach ten and the second malfunction flag F2 is thus not set at one. However, when a wire breakage or a short circuit occurs in the handle angle sensor 25, the count value $C_{K3}$ reaches ten and the CPU 34 thus sets the second malfunction flag F2 to one.

The tilt control routine will now be described with reference to FIGS. 9 and 10.

At step S10, the CPU 34 reads the wheel angle θ, the handle angle Hθ, the vehicle velocity V, and the yaw rate $\omega_s$. At step S20, the CPU 34 determines whether or not the first malfunction flag F1 is set at one. If the wheel angle sensor 21 is functioning normally and the first malfunction flag F1 is set at zero, the CPU 34 proceeds to step S40.

If a wire breakage or short circuit occurs in the wheel angle sensor 21 or if the wheel angle sensor 21 has fallen off from the king pin 21 and the first malfunction flag F1 is thus set at one, the CPU 34 proceeds to step S30 and replaces the value of the wheel angle θ with the value of the handle angle Hθ, which was read in step S10.

Accordingly, if a wire breakage or short circuit occurs in the wheel angle sensor 21 or if the wheel angle sensor 21 falls off from the king pin 21 and the first malfunction flag F1 is set at one, the CPU 34 uses the handle angle He as the wheel angle θ from step S40.

If there is no wire breakage or short circuit in the wheel angle sensor 21 or if the wheel angle sensor 21 has not fallen off from the king pin 21 and the first malfunction flag F1 is set at zero, the CPU 34 keeps using the same value of the wheel angle θ, which was read in step S10, subsequent to step S40.

Figure 7:
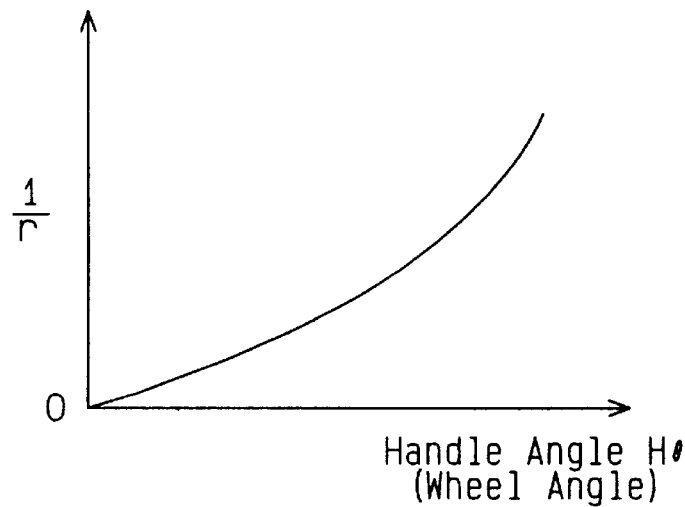
FIG. 7 is a graph showing the relationship between the handle angle θ (wheel angle θ) and the turning radius reciprocal 1/r.

For the sake of brevity, the wheel angle θ will be used to describe the steps starting from S40 even when the value of the handle angle Hθ is actually used as the wheel angle At step S40, the CPU 34 obtains the turning radius reciprocal 1/r from the wheel angle θ using a map stored in the ROM 35. FIG. 7 shows the map illustrating the relationship between the handle angle Hθ (wheel angle θ) and the turning radius reciprocal 1/r.

At step S50, the estimated lateral acceleration Gc is calculated from equation (1) using the vehicle velocity V and the turning radius reciprocal 1/r. At step S60, the CPU 34 calculates the yaw rate changing rate Y. In other words, the CPU 34 reads the wheel angle data θ1, which was taken a predetermined time ΔT earlier, from a predetermined memory area of the RAM 36. The CPU 34 then obtains the turning radius reciprocal 1/r1 corresponding to the wheel angle value θ1 and calculates the estimated yaw rate changing rate Y using equation (2).

At step S70, the lateral acceleration Gs is calculated from the following equation using the vehicle velocity V and the yaw rate $\omega_s$.

$$Gs = V \cdot \omega s$$

At step S80, the CPU 34 calculates the yaw rate changing rate Ys using the yaw rate $\omega_s$.

$$Ys = \Delta \omega_s / \Delta T$$

At step S90, the CPU 34 determines whether or not the second malfunction flag F2 is set at one. If the handle angle sensor 25 is functioning normally and the second malfunction flag F2 is set at zero, the CPU 34 proceeds to step S100.

At step S100, the CPU 34 determines whether or not the estimated yaw rate changing rate Y is equal to or greater than the reference value $y_0$. If the condition of $Y \geq y_0$ is satisfied, the CPU 34 proceeds to step S150 and generates a lock command. More specifically, the CPU 34 sends a lock signal to the electromagnetic switch vaspool to shift the spool to its closing position. If the condition of $Y < y_o$ is satisfied, the CPU 34 proceeds to step S110.

At step S110, the CPU 34 determines whether or not the estimated lateral acceleration Gc is equal to or greater than the associated reference value $g_0$. If the condition of $Gc \geq g_0$ is satisfied, the CPU 34 proceeds to step S150 and generates a lock command. More specifically, the CPU 34 sends a lock signal to the electromagnetic switch valve 14 to shift the spool to its closing position. If the condition of $Gc < g_0$ is satisfied, the CPU 34 proceeds to step S120.

At step S120, the CPU 34 determines whether the yaw rate changing rate Ys is equal to or greater than the reference value $y_1$. If the condition of $Ys < y_1$ is satisfied, the CPU 34 proceeds to step S130.

At step S130, the CPU 34 determines whether or not the lateral acceleration value Gs is equal to or greater than the associated reference value $g_1$. If the condition of $Gs \geq g_1$ is satisfied, the CPU 34 proceeds to step S150 and generates a lock command. More specifically, the CPU 34 sends a lock signal to the electromagnetic switch valve 14 to shift the spool to its closing position. If the condition of $Gs < g_1$ is satisfied, the CPU 34 proceeds to step S140 and generates an unlock command. More specifically, the CPU 34 sends an unlock signal to the electromagnetic switch valve 14 to shift the spool to its communication position.

Therefore, when any one of the yaw rate changing rate Y, Ys and the lateral acceleration Gc, Gs becomes equal to or greater than its associated reference value $y_0$, $g_0$, $y_1$, $g_1$, the electromagnetic switch valve 14 is shifted to the closing position to lock the rear axle 10. In this embodiment, the reference values $y_0$, $y_1$ are equal to each other. The reference values $g_0$, $g_1$ are also equal to each other. However, the corresponding reference values may differ from one another.

In step 110, if the condition of $G < g_0$ is satisfied, the CPU 34 may skip steps 120, 130 and proceed directly to step S140.

Figure 8:
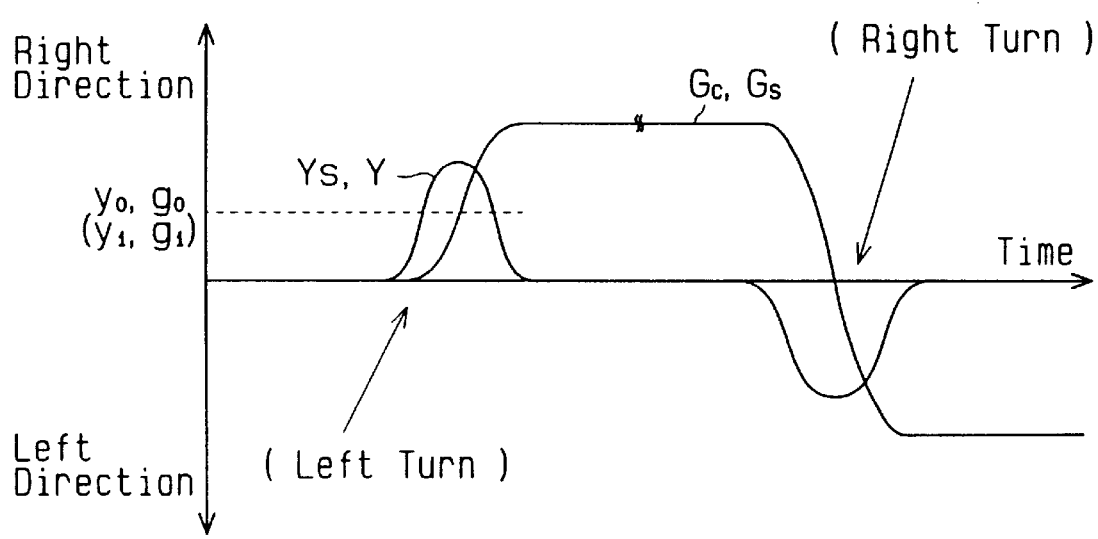
FIG. 8 is a graph showing the fluctuation of lateral acceleration and yaw rate changing rate during steering of the forklift.

FIG. 8 is graph showing changes in the relationship between the lateral acceleration Gc, Gs and the yaw rate changing rate Y, Ys when the forklift 1 changes directions. For example, if the forklift 1 is traveling straight and then turned to the left, the yaw rate changing rates Y, Ys exceed the associated reference values $y_0$, $y_1$, and locks the rear axle 10 at an early stage. As the wheel angle θ (handle angle Hθ) becomes constant, the yaw rate changing rates Y, Ys become lower than the associated reference values $y_0$, $y_1$. However, the lateral acceleration Gc, Gs is equal to or greater than the associated reference values $g_0$, $g_1$, at this point. Thus, the rear axle 10 remains locked as long as the forklift 1 is turned.

When the forklift 1 is turned to the right after being turned to the left, the lateral acceleration temporarily becomes lower than the associated reference values $g_0$, $g_1$ as the direction of the lateral acceleration changes from left to right. However, the yaw rate changing rate Y, Ys is equal to or greater than the associated reference value $y_0$, $y_1$ during this period. Thus, the rear axle 10 remains locked when the forklift 1 is successively steered in opposite directions. In FIG. 8, the reference values $g_0$, $g_1$ and $y_0$, $y_1$ are shown as equal values for the sake of brevity. However, these values do not necessarily have to be equal to each other.

If the handle angle sensor 25 is malfunctioning and the second malfunction flag F2 is set at one in step S90, the CPU 34 proceeds to step S120. The CPU 34 then determines whether or not to generate a lock command based on the yaw rate changing rate Ys and the lateral acceleration Gs, which are calculated from the yaw rate $\omega_s$, in steps 120 and 130.

More specifically, at step S120, the CPU 34 determines whether or not the yaw rate changing rate Ys is equal to or greater than the associated reference value $y_1$. If the condition of $Ys < y_1$ is satisfied, the CPU 34 proceeds to step S150 and generates a lock command. If the condition of $Ys < y_1$ is satisfied in step S120, the CPU 34 proceed to step S130.

At step S130, the CPU 34 determines whether or not the lateral acceleration value Gs is equal to or greater than the associated reference value $g_1$. If the condition of $Gs \geq g_1$ is satisfied, the CPU 34 proceeds to step S150 and generates a lock command. If the condition of $Gs < g_1$ is satisfied, the CPU 34 proceeds to step S140 and generates an unlock command.

The advantages obtained in this embodiment are described below.

(a) When the wheel angle sensor 21 and the handle angle sensor 25 are functioning normally, the CPU 34 obtains the wheel angle θ detected by the wheel angle sensor 21. The CPU 34 also calculates the yaw rate changing rates Y, Ys and the lateral accelerations Gc, Gs based on the yaw rate $\omega_s$ detected by the gyroscope 45. When any one of the yaw rate changing rates Y, Ys and the lateral accelerations Gc, Gs becomes equal to or greater than the associated reference values $y_0$, $y_1$, $g_0$, $g_1$, the CPU 34 locks the axle restricting mechanism, which includes the damper 13 and the electromagnetic switch valve 14. Therefore, the stabilization of the forklift 1 is guaranteed when changing directions.

(b) When the wheel angle sensor 21 is malfunctioning but the handle angle sensor 25 is functioning normally, the CPU 34 calculates the yaw rate changing rates Y, Ys and the lateral accelerations Gc, Gs based on the handle angle Hθ detected by the handle angle senor 25 and the yaw rate $\omega_s$ detected by the gyroscope 45, which is a yaw rate sensor. When any one of the yaw rate changing rates Y, Ys and the lateral accelerations Gc, Gs becomes equal to or greater than the associated reference values $y_0$, $y_1$, $g_0$, $g_1$, the CPU 34 locks the axle restricting mechanism, which includes the damper 13 and the electromagnetic switch valve 14. Therefore, the stabilization of the forklift 1 is guaranteed when changing directions despite the malfunctioning wheel angle sensor 21.

(c) The CPU 34 calculates the yaw rate changing rate Ys and the lateral acceleration Gs based on the yaw rate $\omega_s$ detected by the gyroscope 45 even when the wheel angle sensor 21 and the handle angle sensor 25 are both malfunctioning. When any one of the yaw rate changing rate Ys and the lateral acceleration Gs becomes equal to or greater than the associated reference values $y_1$, $g_1$, the CPU 34 locks the axle restricting mechanism, which includes the damper 13 and the electromagnetic switch valve 14. Therefore, the stabilization of the forklift 1 is guaranteed when changing directions regardless of the wheel angle sensor 21 and the handle angle sensor 25 both malfunctioning.

(d) The handle angle sensor 25, which detects the handle angle Hθ that changes synchronously with the wheel angle θ, is used to test the wheel angle sensor 21. Furthermore, the CPU 34 locates malfunctions by determining whether or not the relationship between the handle angular velocity ΔHθ/ΔT and the wheel angular velocity Δθ/ΔT satisfies the condition of ΔHθ/ΔT>0 and Δθ/ΔT=0. Therefore, if the wheel angle sensor 21 falls off from the king pin 21, the acknowledgment of the missing state of the wheel angle sensor 21 is guaranteed.

(e) The CPU 34 monitors the voltage corresponding to the wheel angle θ detected by the wheel angle sensor 21 and determines whether or not the voltage is included within a range that indicates normal functioning of the wheel angle sensor 21. This locates the occurrences of wire breakage and short circuit in the wheel angle sensor 21.

(f) When the wheel angle sensor 21 malfunctions, the handle angle Hθ is used as the wheel angle. Thus, when the wheel angle sensor 21 malfunctions, the CPU 34 performs substantially the same control as when the wheel angle sensor 21 functions normally.

(g) The CPU 34 monitors the voltage corresponding to the handle angle Hθ detected by the handle angle sensor 25 and determines whether or not the voltage is included within a range that indicates normal functioning of the handle angle sensor 25. This locates the occurrences of wire breakage and short circuit in the handle angle sensor 25.

(h) The CPU 34 also locks the rear axle 10 when the yaw rate changing rates Y, Ys become equal to or greater than the associated reference values $y_0$, $y_1$. This readily locks the rear axle 10 when the operator of the forklift 1 starts to turn the steering handle. Furthermore, the rear axle 10 is prevented from being unlocked when the forklift 1 is turned successively from one direction to the other. Thus, the forklift 1 is always stabilized when changing directions.

(i) The handle angle sensor 25, which was originally employed for other purposes, is used when testing the swing control sensors. The handle angle sensor 25 is also used in lieu of the wheel angle sensor 25 when the wheel angle sensor 25 malfunctions. The employment of the same sensor for different purposes is beneficial in terms of production costs.

A second embodiment according to the present invention will now be described with reference to FIGS. 14 and 15. In this embodiment, like or identical elements corresponding to that of the first embodiment will be denoted with the same reference numerals.

The sensor testing routine executed in the second embodiment is the same as that executed in the first embodiment.

In the second embodiment, the wheel angle θ and the handle angle Hθ are used to obtain the estimated yaw rate changing rate and the lateral acceleration. The wheel angle θ is used to obtain the turning radius r, the lateral acceleration Gc, and the estimated yaw rate changing rate Y. The handle angle Hθ is used to obtain the turning radius rh, the lateral acceleration Gch, and the estimated yaw rate changing rate Yh.

Figure 14:
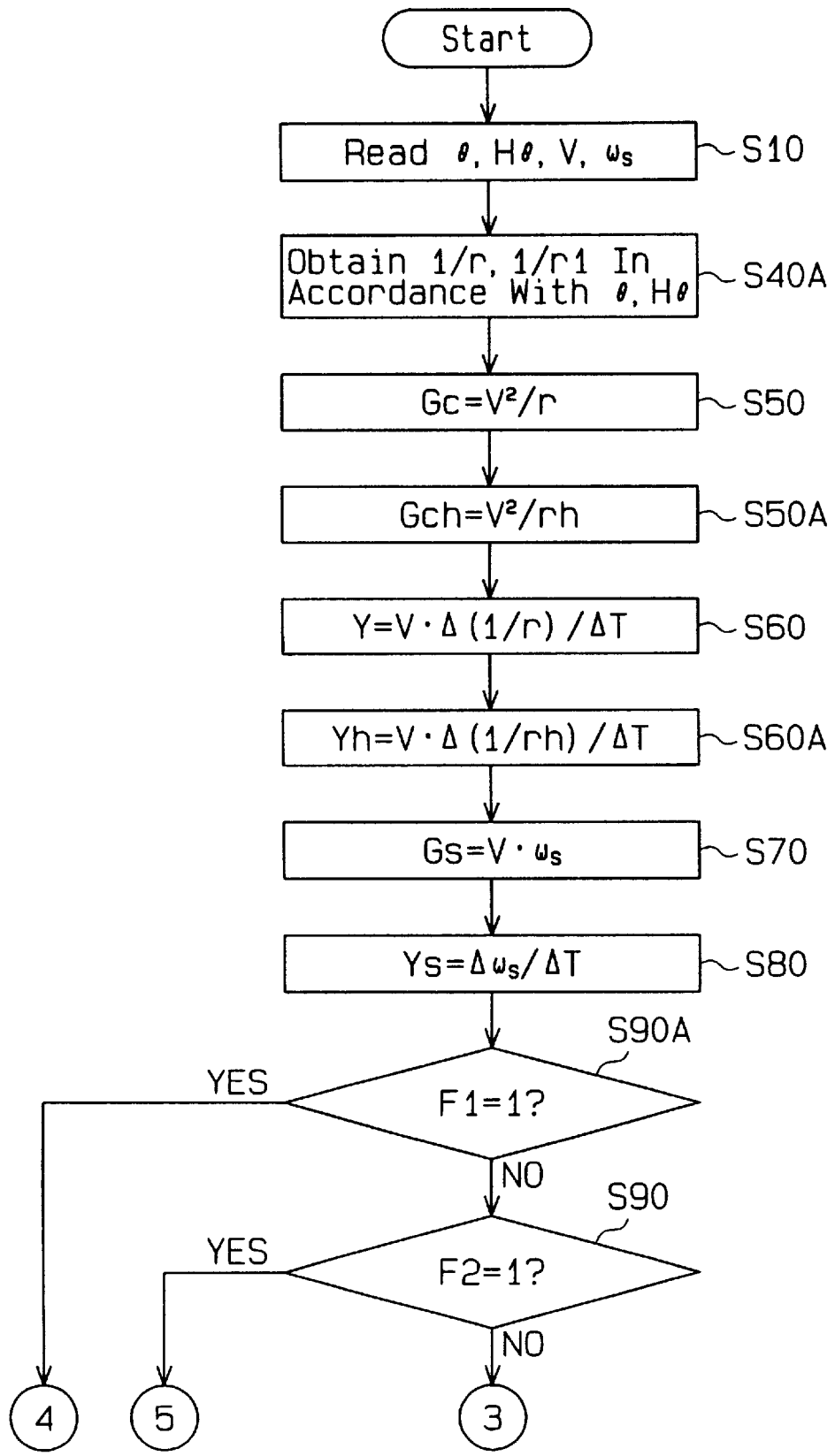
FIG. 14 is a flowchart showing the tilt control routine employed in a further embodiment according to the present invention.
Figure 15:
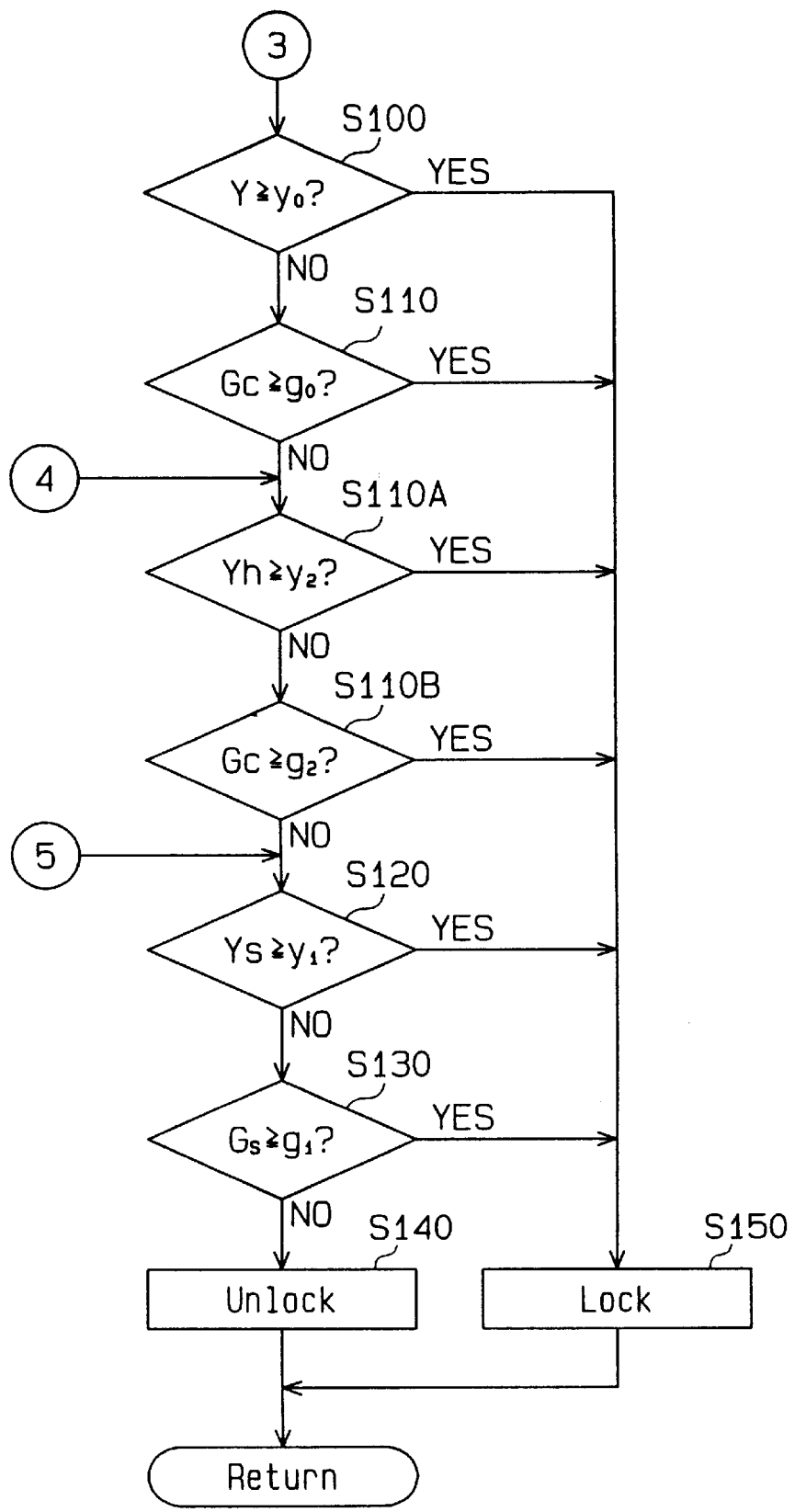
FIG. 15 is a flowchart showing the swing control routine continuing from FIG. 14.

In the flowcharts shown in FIGS. 14 and 15, steps S10, S40A, S50 are carried out to detect the first judgement value. Steps S10, S40A, S50A are carried out to detect the second judgement value.

Steps S10, S70 are carried out to detect the third judgement value. Steps S10, S80 are carried out to detect the yaw rate changing rate. Steps S100 to S150 are carried out to lock the axle to the vehicle body. The ROM 35 stores maps used to obtain the turning radius reciprocal 1/r from the wheel angle θ and the turning radius reciprocal 1/rh from the handle angle Hθ. The turning radius reciprocal 1/r, which corresponds to the wheel angle θ, is used to calculate the estimated lateral acceleration Gc. The turning radius reciprocal 1/rh, which corresponds to the handle angle Hθ, is used to calculate the estimated lateral acceleration Gch.

The flowchart of the tilt control routine shown in FIGS. 14 and 15 will now be described. The flowchart differs from the corresponding flowchart of the first embodiment shown in FIGS. 9 and 10 in that steps 20 and 30 are deleted. Step 40 is replaced by step 40A. Step 50A is inserted between steps 50 and 60. Step 60A is inserted between step 60 and 70. Step 90A is inserted between step 80 and 90. Steps 110A and 110B are inserted between steps 110 and 120. The other steps are identical to the corresponding steps carried out in the flowchart of the tilt control routine shown in the flowchart of FIGS. 9 and 10.

When entering the tilt control routine, the CPU 34 first carries out step S10. The CPU 34 then proceeds to step S40A and refers to a map stored in the ROM 35 to obtain the turning radius reciprocal 1/r corresponding to the wheel angle θ and the turning radius value 1/rh corresponding to the handle angle Hθ.

The CPU 34 then carries out step S50 and proceeds to step S50A afterward. At step S50A, the CPU 34 calculates the estimated lateral acceleration value Gch from equation (1). At step S60, the CPU 34 calculates the estimated yaw rate changing rate Y. At step S60A, the CPU 34 calculates the estimated yaw rate changing rate Yh from the handle angle Hθ.

After carrying out steps S70 and S80, the CPU 34 proceeds to step S90A and determines whether or not the first malfunction flag F1 is set at one. If the wheel angle sensor 21 is functioning normally and the first malfunction flag F1 is set at zero, the CPU 34 proceeds to step S90. At step S90A, if the wheel angle sensor 21 is malfunctioning and the first malfunction flag F1 is set at one, the CPU 34 proceeds to step S110A.

At step S90, the CPU 34 determines whether the second malfunction flag F2 is set at one. If the handle angle sensor 25 is functioning normally and the second malfunction flag F2 is set at zero, the CPU 34 proceeds to step S100. At step S90, if the second malfunction flag F2 is set at one, the CPU 34 proceeds to step S120.

At step S100, the CPU 34 determines whether or not the estimated yaw rate changing rate Y is equal to or greater than the associated reference value $y_0$ in the same manner as the first embodiment. If the condition of $Y \geq y_0$ is satisfied, the CPU 34 proceeds to step S150 and generates a lock command. If the condition of $Y < y_0$ is satisfied, the CPU 34 proceeds to step S110.

At step S110, the CPU 34 determines whether or not the estimated lateral acceleration value Gc is equal to or greater than the associated reference value $g_0$. If the condition of $Gc \geq g_0$ is satisfied, the CPU 34 proceeds to step S150 and generates a lock command. If the condition of $Gc < g_0$ is satisfied, the CPU 34 proceeds to step S110A.

At step S110A, the CPU 34 determines whether the estimated yaw rate changing rate Yh is equal to or greater than a reference value $y_2$. The reference value $y_2$ may take an arbitrary value and is thus not required to be equal to the reference values $y_0$ or $y_1$. If the condition of $Yh \geq y_2$ is satisfied, the CPU 34 proceeds to step S150 and generates a command signal. If the condition of $Yh < y_2$ is satisfied, the CPU 34 proceeds to step S110B.

At step S119B, the CPU 34 determines whether or not the presumed lateral acceleration Gch is equal to or greater than a reference value $g_2$. The reference value $g_2$ may take an arbitrary value and is thus not required to be equal to the reference values $g_0$ or $g_1$. If the condition of $Gch \geq g_2$ is satisfied, the CPU 34 proceeds to step S150 and generates a command signal. If the condition of $Gch < g_2$ is satisfied, the CPU 34 proceeds to step S120 and performs the subsequent steps in the same manner as the first embodiment. At step S110, if the condition of $\Delta Gc < g_0$ is satisfied, the CPU 34 may skip steps S110A, S110B, S120, S130 and proceed directly to step S140. Furthermore, if the condition of $Gch < g_2$ is satisfied in step S110B, the CPU 34 may skip steps S120, S130 and proceed directly to step S140.

Accordingly, when any one of the yaw rate changing rates Y, Yh, Ys and the lateral accelerations Gc, Gch, Gs becomes equal to or greater than the associated reference values $y_0$, $Y_2$, $Y_1$, $g_0$, $g_2$, $g_1$, the condition for locking the axle is satisfied.

The advantages obtained in the second embodiment are described below.

(a) When the wheel angle sensor 21 and the handle angle sensor 25 are functioning normally, the CPU 34 obtains the wheel angle θ detected by the wheel angle sensor 21 and the handle angle sensor Hθ. The CPU 34 also calculates the yaw rate changing rates Y, Yh, Ys and the lateral accelerations Gc, Gch, Gs based on the yaw rate $\omega_s$ detected by the gyroscope 45. When any one of the yaw rate changing rates Y, Yh, Ys and the lateral accelerations Gc, Gch, Gs becomes 5 equal to or greater than the associated reference values $y_0$, $y_2$, $y_1$, $g_0$, $g_2$, $g_1$, the CPU 34 locks the axle restricting mechanism, which includes the damper 13 and the electromagnetic switch valve 14. Therefore, the stabilization of the forklift 1 is guaranteed when changing directions.

(b) When the wheel angle sensor 21 is malfunctioning but the handle angle sensor 25 is functioning normally, the CPU 34 calculates the yaw rate changing rates Yh, Ys and the lateral accelerations Gch, Gs based on the handle angle Hθ detected by the handle angle senor 25 and the yaw rate $\omega_s$ detected by the gyroscope 45. When any one of the yaw rate changing rates Yh, Ys and the lateral accelerations Gch, Gs becomes equal to or greater than the associated reference values $y_2$, $Y_1$, $g_2$, $g_1$, the CPU 34 locks the axle restricting mechanism, which includes the damper 13 and the electromagnetic switch valve 14. Therefore, the stabilization of the forklift 1 is guaranteed when changing directions despite the malfunctioning wheel angle sensor 21.

(c) The CPU 34 calculates the yaw rate changing rate Ys and the lateral acceleration Gs based on the yaw rate $\omega_s$ detected by the gyroscope 45 even when the wheel angle sensor 21 and the handle angle sensor 25 are both malfunctioning. When any one of the yaw rate changing rate Ys and the lateral acceleration Gs becomes equal to or greater than the associated reference values $y_1$, $g_1$, the CPU locks the axle restricting mechanism, which includes the damper 13 and the electromagnetic switch valve 14. Therefore, the stabilization of the forklift 1 is guaranteed when changing directions regardless of the wheel angle sensor 21 and the handle angle sensor 25 both malfunctioning.

(d) The advantages described in paragraphs (d) to (i) are also obtained in this embodiment.

A third embodiment according to the present invention will now be described.

In the first embodiment, when the CPU 34 calculates the yaw rate changing rate Y from equation (2), that is, $Y = V \cdot \Delta(1/r)/\Delta T$, the vehicle velocity V is considered as being constant. However, in this embodiment, the CPU 34 takes into consideration the changes in the vehicle velocity V. The third embodiment differs from the first embodiment only in the equation for calculating the yaw rate changing rate Y.

In the same manner as the first embodiment, the third embodiment employs the wheel angle sensor 21, the handle angle sensor 25, and the vehicle speed sensor 22. In this embodiment, the yaw rate changing rate Y ($=\Delta\omega/\Delta T$) is calculated by using equation (3) in lieu of equation (2) to reflect changes in the vehicle speed V.

Equation (3) is shown below again.

$$Y = V \cdot \Delta(1/r)/\Delta T + \Delta V/\Delta T \cdot (1/r) \tag{3}$$

The ROM 35 stores the following equation (3a) to calculate the yaw rate changing rate Y from equation (3).

$$Y = V \cdot |1/r - 1/r1|/\Delta T + (1/r) \cdot |V - V1|/\Delta T \tag{3a}$$

In equation (3a), V1, V represents the vehicle velocity before and after the predetermined time $\Delta T(=n \cdot \Delta To)$ elapses. Furthermore, 1/r1, 1/r are turning radius reciprocals that are obtained from the wheel angles θ1, θ by referring to maps. In this embodiment, the RAM 36 stores a number of prior wheel angle data θ and vehicle velocity data V.

An equation such as the following equation (4) may be used instead of equation (3) to compute the yaw rate changing rate Y.

$$Y = \Delta(V/r)/\Delta T \tag{4}$$

The ROM 35 stores the following equation (4a) to calculate the yaw rate changing rate Y based on equation (4).

$$Y = |Ys - Ys1|/\Delta T (= |Vr - V1/r1|/\Delta T) \tag{4a}$$

In equation (4a), Ys1, Ys represent the yaw rate data before and after the predetermined time ΔT elapses and may also be indicated as Ysl=V1/r1 and Ys=V/r. V1, V represent vehicle velocities before and after the predetermined time ΔT elapses, while 1/r1, 1/r represent the turning radius reciprocals before and after the predetermined time ΔT elapses. The CPU 34 stores a number of prior lateral acceleration data Gc in the RAM 36. Noise increases when the detected vehicle velocity V is employed as the changing amount. Therefore, in this embodiment, software for filtering the noise is provided to prevent an increase in the amount of noise. The CPU 34 uses equations (3a) or (4a) to calculate the yaw rate changing rate based on the present data of V, 1/r and the prior data of V1, 1/r1 taken earlier by a predetermined time ΔT.

The following advantage is obtained from the third embodiment.

(a) In this embodiment, the yaw rate changing rate Y is obtained taking into consideration changes in the vehicle velocity with respect to time using equations (3) and (4). Thus, an accurate yaw changing rate Y may be obtained even when changes in the vehicle velocity V cannot be ignored such as during acceleration or deceleration (e.g., during application of the brakes). Accordingly, the rear axle 10 is locked when necessary regardless of changes in the vehicle velocity. This prevents unnecessary locking of the rear axle.

A fourth embodiment according to the present invention will now be described with reference to FIGS. 16 and 17. The hardware structure of this embodiment is the same as that of the first embodiment. Thus, like and identical corresponding elements will be denoted with the same reference numerals in this embodiment.

In the fourth embodiment, the lateral acceleration changing rate is used as the judgement value in lieu of the yaw rate changing rate Y. The sensor testing routine performed in this embodiment is identical to that performed in the first embodiment. The tilt control program differs from that performed in the first embodiment.

Various program data are stored in the ROM 35. Such data include the tilt control routine shown in the flowchart of FIGS. 16 and 17.

In this embodiment, the lateral acceleration Gc (or centrifugal force applied to forklift when changing directions) and the lateral acceleration changing rate η are obtained and then used as the judgement values. The rear axle 10 is locked when either the lateral acceleration Gc or the lateral acceleration changing rate η become equal to or greater than an associated reference value.

Figure 16:
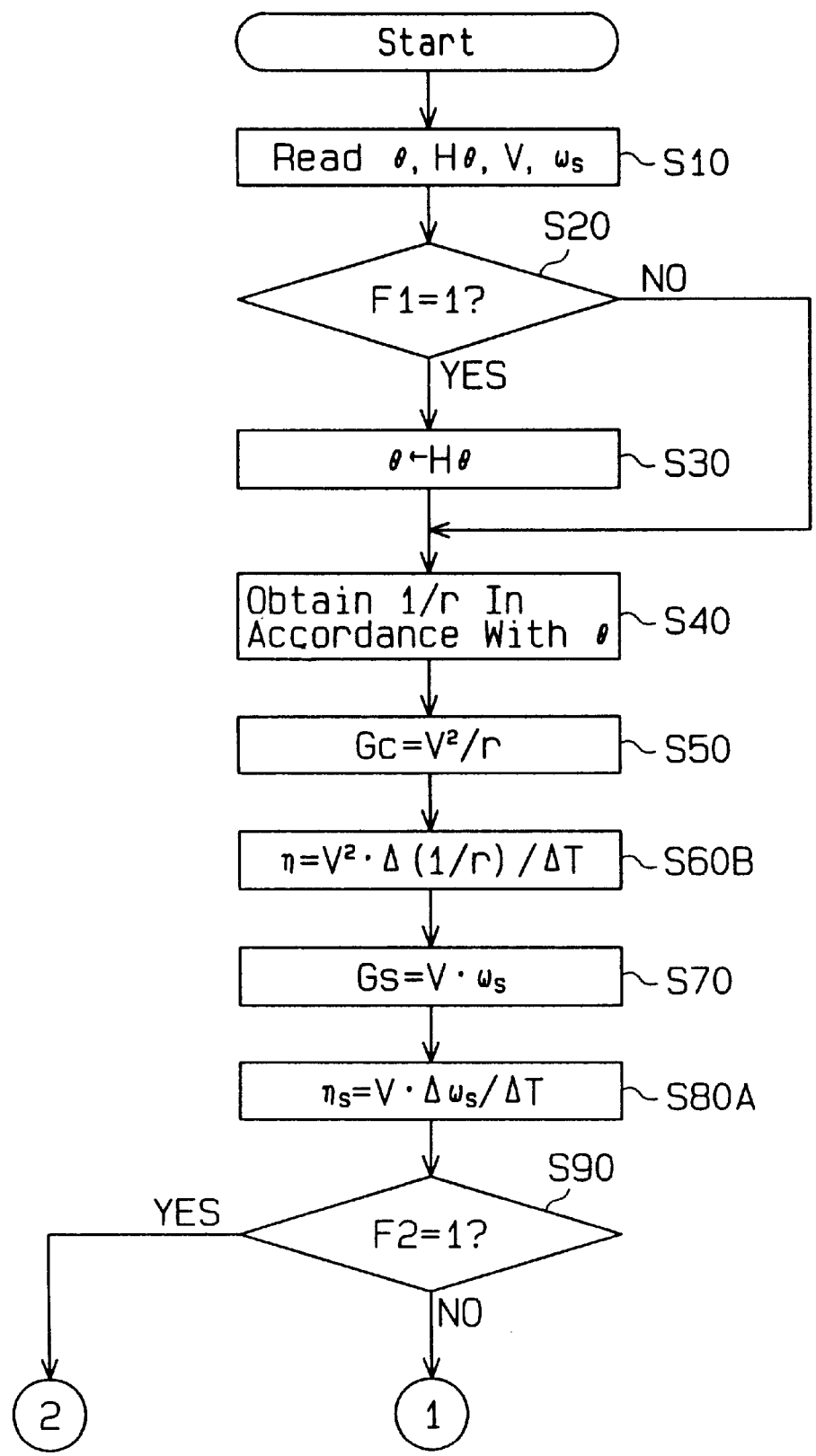
FIG. 16 is a flowchart showing the swing control employed in a further embodiment according to the present invention.
Figure 17:
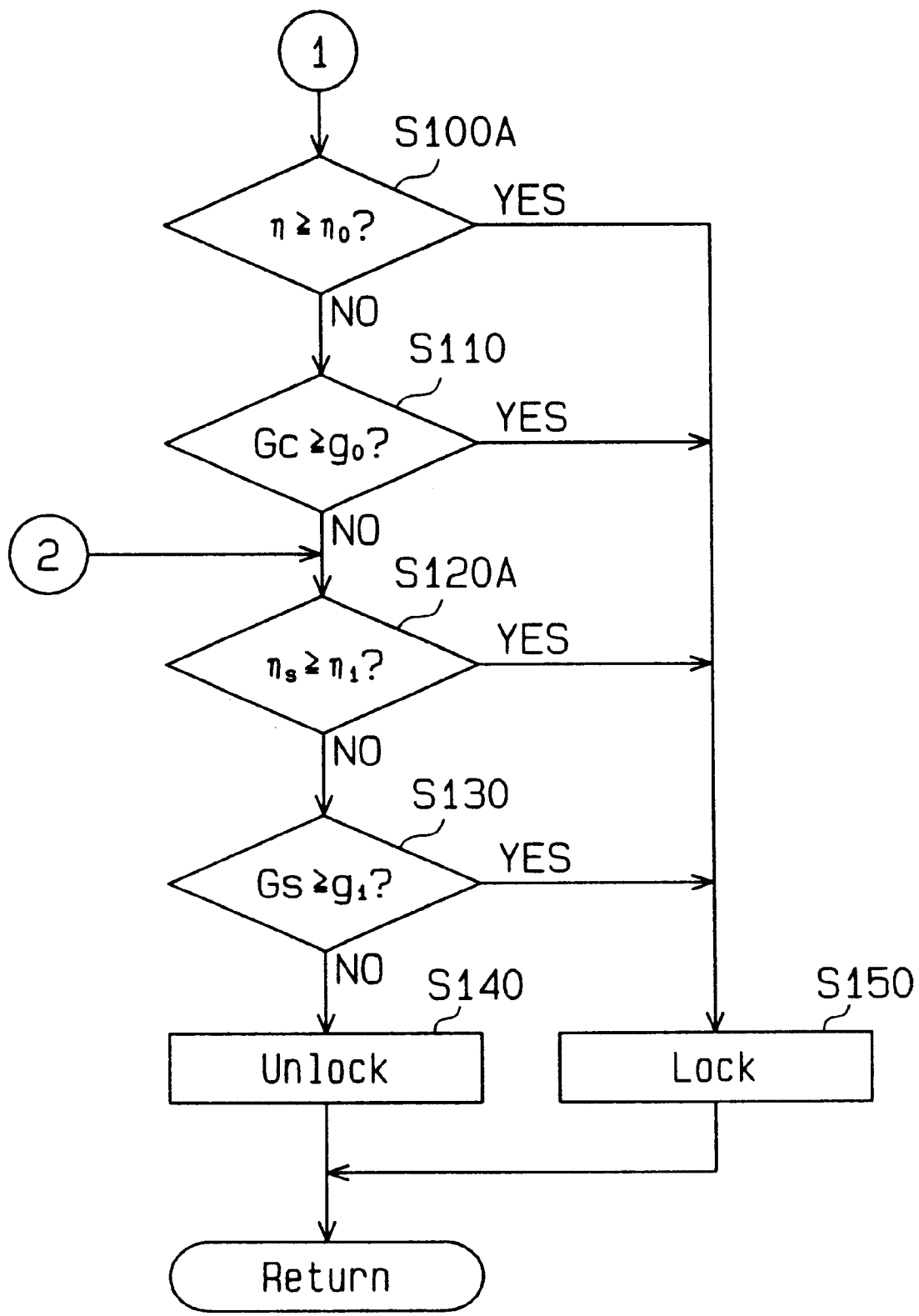
FIG. 17 is a flowchart showing the swing control continuing from FIG. 16.

In the flowchart shown in FIGS. 16 and 17, steps S10, S40, S50, S60B are carried out to detect the first and second judgement values. Steps S10, S70, S80A are carried out to detect the third judgement value. Steps S100A to S150 are carried out to control the tilting of the axle.

The ROM 35 stores the reference value $\eta_0$ associated with the lateral acceleration changing rate η. The reference values $g_0$, $\eta_0$ are obtained through experiments and theoretical calculations and are set so that the rear axle 10 is locked when necessary to stabilize the traveling forklift.

The lateral acceleration time differential ΔG/66 T, or lateral acceleration changing rate η is obtained from the following equation (5).

$$\eta = \Delta G/\Delta T = V^2 \cdot \Delta(1/r)/\Delta T \quad (5)$$

The lateral acceleration changing rate η is calculated from the following equation (5a), which is a modification of equation (5), using the wheel angle θ (or handle angle Hθ), the vehicle velocity V, and a map.

$$\eta = \Delta G/\Delta T = V^2 \cdot |1/r - 1/r1|/\Delta T \quad (5a)$$

In equation (5a), η represents the lateral acceleration changing amount per predetermined time ΔT (e.g., ten milliseconds), while 1/r and 1/r1 each represent the turning radius reciprocal before and after the predetermined time ΔT elapses.

The lateral acceleration changing rate η corresponds to the time differential of equation (1) described in the first embodiment and is represented by the following equation.

$$\eta = V^2 \cdot \Delta(1/r)/\Delta T + (1/r) \cdot 2V \cdot \Delta V/\Delta T \quad (6)$$

In equation (6), the second clause ΔV/ΔT represents the changing rate of the vehicle velocity V. The vehicle velocity V of the forklift 1 when changing directions is normally considered as being constant. Thus, the value represented by ΔV/ΔT is much smaller than the value represented by Δ(1/r)/ΔT, which is shown in the second clause. In this embodiment, the second clause in equation (6) is ignored and the value of η is obtained from equation (5).

The ROM 35 stores the reference value $\eta_1$ of the lateral acceleration changing rate θ. The reference values $g_0$, $\eta_1$ are obtained through experiments and theoretical calculations and are set so that the rear axle 10 is locked when necessary to stabilize the traveling forklift.

The lateral acceleration time differential ΔG/ΔT, or lateral acceleration changing rate $\eta_s$, is obtained from the following equation (7).

$$\eta_s = \Delta G/\Delta T = V \cdot \Delta \omega/\Delta T \quad (7)$$

In this embodiment, the values $\omega_s$ and V are used to calculate the lateral acceleration changing rate $\omega_s$ from equation (7a), which is a modification of equation (7).

$$\eta_s = \Delta G/\Delta T = V \cdot |\omega_s - \omega 1|/\Delta T \quad (7a)$$

In equation (7a), $\eta_s$ represents the lateral acceleration changing rate per predetermined time ΔT (e.g., ten milliseconds), while $\omega_s$, ω1 represent the angular acceleration before and after the predetermined time ΔT elapses.

The flowchart of FIGS. 16 and 17 will now be described.

In the flowchart, step S60 of the flowchart shown in FIG. 8 of the first embodiment is changed to step S60B. Step S80 is changed to step S80A, step S100 is changed to step S100A, and step 120 is changed to step S120A. The other steps are identical to the corresponding steps of the first embodiment.

When executing the tilt control routine in accordance with the flowchart of FIGS. 16 and 17, the CPU 34 proceeds to step S60B after carrying out step S50. At step 60B, the CPU 34 calculates the lateral acceleration changing rate η.

In other words, the CPU 34 reads the wheel angle data θ1, which was taken earlier by a predetermined time ΔT, from a predetermined area of the RAM 36. The CPU 34 then obtains the turning radius reciprocal 1/r1 corresponding to the value of θ1 and obtains the value of η from equation (5). Afterward, the CPU 34 proceeds to step S70.

At step S70, the CPU 34 calculates the lateral acceleration Gs. At step 80A, the CPU 34 calculates the lateral acceleration changing rate $\eta_s$ based on the vehicle velocity V and the yaw rate $\omega_s$ from the following equation:

$$\eta_s = V \cdot \Delta \omega_s /\Delta T$$

At step S90, the CPU 34 judges whether or not the second malfunction flag F2 is set at one. If the handle angle sensor 25 is functioning normally and the second malfunction flag F2 is set at zero, the CPU 34 proceeds to step S100A.

At step S100A, the CPU 34 determines whether or not the lateral acceleration changing rate η is equal to or greater than the associated reference value $\eta_0$. If the condition of $\eta \geq \eta_0$ is satisfied, the CPU 34 proceeds to step S150 and generates a lock command. If the condition of $\eta \geq \eta_0$ is satisfied, the CPU 34 proceeds to step S110.

At step S110, the CPU 34 determines whether the presumed lateral acceleration Gc is equal to or greater than the reference value $g_0$. If the condition of $Gc \geq g_0$ is satisfied, the CPU 34 proceeds to step S150 and generates a lock command. If the condition of $Gc < g_0$ is satisfied, the CPU 34 proceeds to step S120A.

At step S120A, the CPU 34 determines whether the lateral acceleration changing rate $\eta_s$ is equal to or greater than the reference value $\eta_1$. If the condition of $\eta_s \geq \eta_1$ is satisfied, the CPU 34 proceeds to step S150 and generates a lock command. If the condition of $\eta_s < \eta_1$ is satisfied, the CPU 34 proceeds to step S130.

At step 130, the CPU 34 determines whether the lateral acceleration Gs is equal to or greater than the reference value $g_1$. If the condition of $Gs \geq g_1$ is satisfied, the CPU 34 proceeds to step S150 and generates a lock command. If the condition of $Gs < g_1$ is satisfied, the CPU 34 proceeds to step S140 and generates an unlock signal.

When any one of the yaw rate changing rates $\eta$, $\eta_s$ and the lateral accelerations Gc, Gs becomes equal to or greater than the associated reference values $\eta_0$, $\eta_1$, $g_0$, $g_1$, the electromagnetic switch valve 14 is switched to the closing position to lock the rear axle 10.

At step S90, if the handle angle sensor 25 is malfunctioning and the second malfunction flag F2 is set at one, the CPU 34 proceeds to step S120A. At steps S120A and S130, the CPU 34 determines whether or not the lateral acceleration changing rate $\eta_s$ and the lateral acceleration Gs, which correspond to the yaw rate $\omega_s$ detected by the gyroscope 45, are greater than the associated reference values. Based on the results of steps S120A and S130, the CPU 34 determines whether or not to generate a lock command or an unlock command.

Accordingly, the axle locking condition is satisfied if any one of the yaw rate changing rates $\eta$, $\eta_s$ and the lateral accelerations Gc, Gs becomes equal to or greater than the associated reference values $\eta_0$, $\eta_1$, $g_0$, $g_1$.

The following advantages are obtained from the fourth embodiment.

(a) When calculating the lateral acceleration changing rate $\eta$ in the fourth embodiment, the CPU 34 differentiates the wheel angle $\theta$ detected by the wheel angle sensor 21, which is unaffected by vibrations of the forklift, and the value 1/r, which is obtained from the handle angle H$\theta$. Accordingly, the lateral acceleration changing rate $\eta$ may be estimated with high reliability regardless of noise amplification.

(b) In this embodiment, the lateral acceleration changing rate $\eta$ is used as a judgement value to determine whether or not to lock the rear axle. Thus, the rear axle is readily locked when the forklift 1 starts to change directions or when the forklift 1 is turned from one direction to another. This stabilizes the forklift 1.

It should be apparent to those skilled in the art that the present invention may be embodied in many other specific forms without departing from the spirit or scope of the invention. Particularly, it should be understood that the present invention may be embodied in the following forms.

(1) The values detected by each sensor and the judgement values calculated from the detected values may be processed by a low pass filter to eliminate noise.

(2) The wheel angle $\theta$ need not be detected from the turning amount of the associated king pin 20. For example, the wheel angle $\theta$ may be detected by a sensor that detects the position of a piston employed in a steering cylinder of a power steering apparatus.

(3) The sensors that detect the values used to calculate the judgement values are not limited to two types. For example, three or more types of sensor that detect different subjects may be used to obtain the judgement values.

(4) The tilting of the axle need not be restricted by completely locking the axle. For example, the tilting of the axle may be limited within a small range. The advantages of the present invention are obtained as long as the tilting of the axle is restricted within a narrow range.

(5) The present invention may be applied to a forklift driven by batteries. The present invention may also be applied to industrial vehicles other than forklifts.

Therefore, the present examples and embodiments are to be considered as illustrative and not restrictive and the invention is not to be limited to the details given herein, but may be modified within the scope and equivalence of the appended claims.

What is claimed is:

1. An industrial vehicle for conveying a load mounted thereon, comprising:

a frame;

an axle pivotally mounted on the frame;

a restriction mechanism for restricting the pivotal movement of the axle;

a pair of vehicle wheels rotatably supported on the axle;

a steering mechanism having a steering wheel for steering the vehicle wheels in accordance with rotation of the steering wheel;

a first detecting device for detecting an angular position of the steering wheel, the angular position representing a steering amount of the steering wheel;

a second detecting device for detecting a wheel angle, wherein the wheel angle is the angle between a plane perpendicular to a rotation axis of the vehicle wheel and a line representing straight running of the vehicle;

a third detecting device for detecting a yaw rate of the vehicle;

a fourth detecting device for detecting a vehicle speed;

calculating means for calculating a plurality of variables based on the detected angular position of the steering wheel, wheel angle, yaw rate and vehicle speed, the variables including lateral acceleration, yaw rate changing rate and lateral acceleration changing rate; and control means for controlling the restriction mechanism to restrict the pivotal motion of the axle when one of the variables exceeds a predetermined reference value.

2. The industrial vehicle according to claim 1, wherein the variables comprise the lateral acceleration and the yaw rate changing rate.

3. The industrial vehicle according to claim 1, wherein the variables comprise the lateral acceleration and the lateral acceleration changing rate.

4. The industrial vehicle according to claim 1 further comprising:

determining means for determining in accordance with the detected angular position and the wheel angle whether the wheel angle alters in response to the angular position of the steering wheel;

wherein the control means determine in accordance with the determination of the determining means whether the second detecting device is out of order, wherein the control means activates the restriction mechanism when the determination of the control means represents malfunction.

5. The industrial vehicle according to claim 1, wherein the steering mechanism includes a steering shaft that rotates integrally with the steering wheel, wherein the first detecting device is provided at the steering shaft and includes a disk having a plurality of slits and a plurality of photo couplers for detecting light beams passing through the slits.

6. The industrial vehicle according to claim 1, wherein the restriction mechanism comprises;

a cylinder for connecting the axle to the frame, the cylinder allowing the pivotal motion of the axle by expanding and contracting under a pressure of oil;

a conduit for supplying the oil to the cylinder;

a control valve connected to the conduit for selectively opening and closing the conduit; and a control unit for controlling the control valve, wherein the supply of the oil from the conduit to the cylinder is allowed when the conduit is opened, and wherein the supply of the oil is stopped when the conduit is closed.

7. The industrial vehicle according to claim 1, wherein the steering mechanism includes a pair of king pins, the vehicle wheels being connected to the axle by associated king pins, the second detecting device being mounted on one of the king pins.

8. The industrial vehicle according to claim 1, wherein the vehicle wheels are rear wheels.

9. An industrial vehicle for conveying a load mounted thereon, comprising:

a frame;

an rear axle pivotally mounted on the frame;

a restriction mechanism for restricting the pivotal movement of the rear axle;

a pair of rear wheels rotatably supported on the rear axle;

a steering mechanism having a steering wheel for steering the rear wheels in accordance with rotation of the steering wheel;

a first detecting device for detecting an angular position of the steering wheel, the angular position representing a steering amount of the steering wheel;

a second detecting device for detecting a wheel angle, wherein the wheel angle is the angle between a plane perpendicular to a rotation axis of the vehicle wheel and a line representing straight running of the vehicle;

a third detecting device for detecting a yaw rate of the vehicle;

a fourth detecting device for detecting a vehicle speed;

calculating means for calculating a plurality of variables based on the detected angular position of the steering wheel, wheel angle, yaw rate and vehicle speed, the variables including lateral acceleration, yaw rate changing rate and lateral acceleration changing rate; and control means for controlling the restriction mechanism to restrict the pivotal motion of the rear axle when one of the variables exceeds a predetermined reference value.

10. The industrial vehicle according to claim 9, wherein the variables comprise the lateral acceleration and the yaw rate changing rate.

11. The industrial vehicle according to claim 9, wherein the variables comprise the lateral acceleration and the lateral acceleration changing rate.

12. The industrial vehicle according to claim 9 further comprising:

determining means for determining in accordance with the detected angular position and the wheel angle whether the wheel angle alters in response to the angular position of the steering wheel;

wherein the control means determine in accordance with the determination of the determining means whether the second detecting device is out of order, wherein the control means activate the restriction mechanism when the determination of the control means represents malfunction.

13. The industrial vehicle according to claim 9, wherein the steering mechanism includes a steering shaft that rotate integrally with the steering wheel, wherein the first detecting device is provided at the steering shaft and includes a disk having a plurality of slits and a plurality of photo couplers for detecting light beams passing through the slits.

14. The industrial vehicle according to claim 9, wherein the restriction mechanism comprises;

a cylinder for connecting the rear axle to the frame, the cylinder allowing the pivotal motion of the rear axle by expanding and contracting under a pressure of oil;

a conduit for supplying the oil to the cylinder;

a control valve connected to the conduit for selectively opening and closing the conduit; and a control unit for controlling the control valve, wherein the supply of the oil from the conduit to the cylinder is allowed when the conduit is opened, and wherein the supply of the oil is stopped when the conduit is closed.

15. The industrial vehicle according to claim 9, wherein the steering mechanism includes a pair of king pins, the rear wheels being connected to the rear axle by associated king pins, the second detecting device being mounted on one of the king pins.

16. The industrial vehicle according to claim 9, wherein the industrial vehicle is a forklift.

\* \* \* \* \*

UNITED STATES PATENT AND TRADEMARK OFFICE
CERTIFICATE OF CORRECTION

PATENT NO. : 6,047,229
DATED : April 4, 2000
INVENTOR(S) : Kazuo Ishikawa

It is certified that error appears in the above-identified patent and that said Letters Patent is hereby corrected as shown below:

Column 2,
Line 61, after "frame" change "la" to the numeral -- 1a --.

Column 5,
Line 41, in the equation, before "=" change "|" to -- ( --.

Column 6,
Line 21, in the equation, change "=" to -- $\risingdotseq$ --.

Column 8,
Line 60, after "angle" change "He" to -- H$\theta$ --.

Column 9,
Line 3, after "angle" (second instance) insert -- $\theta$ --;
Line 38, change "vaspool" to -- valve 14 --.

Column 10,
Line 40, change "Ys<$y_1$" to -- Ys$\geq y_1$ --.

Column 13,
Line 28, change "S119B" to -- S110B --.

Column 14,
Line 19, after "CPU" insert -- 34 --.

Column 15,
Line 58, change "$\Delta$G/66 T" to -- $\Delta G/\Delta T$ --.

UNITED STATES PATENT AND TRADEMARK OFFICE
CERTIFICATE OF CORRECTION

PATENT NO. : 6,047,229
DATED : April 4, 2000
INVENTOR(S) : Kazuo Ishikawa

It is certified that error appears in the above-identified patent and that said Letters Patent is hereby corrected as shown below:

Column 17,
Line 2, change "$\eta \geqq \eta_0$" to -- $\eta \geq \eta_0$ --;
Line 3, change "$\eta \geqq \eta_0$" to -- $\eta < \eta_0$ --;

Signed and Sealed this

Nineteenth Day of March, 2002

Attest:

Attesting Officer

JAMES E. ROGAN
Director of the United States Patent and Trademark Office